US005598300A

United States Patent [19]
Magnusson et al.

[11] Patent Number: 5,598,300
[45] Date of Patent: Jan. 28, 1997

[54] EFFICIENT BANDPASS REFLECTION AND TRANSMISSION FILTERS WITH LOW SIDEBANDS BASED ON GUIDED-MODE RESONANCE EFFECTS

[75] Inventors: Robert Magnusson; Shu-Shaw Wang, both of Arlington, Tex.

[73] Assignee: Board of Regents, The University of Texas System, Austin, Tex.

[21] Appl. No.: 465,386

[22] Filed: Jun. 5, 1995

[51] Int. Cl.⁶ ................................ G02B 5/20
[52] U.S. Cl. ............ 359/566; 333/212; 385/27; 385/37
[58] Field of Search .................. 385/10, 15, 27, 385/31, 37, 39, 129–131; 359/566, 569, 575, 576; 333/202, 208, 209, 210, 212

[56] References Cited

U.S. PATENT DOCUMENTS

| | | | |
|---|---|---|---|
| 3,868,589 | 2/1975 | Wang | 372/96 |
| 4,039,249 | 8/1977 | Kaminow et al. | 385/14 |
| 4,093,339 | 6/1978 | Cross | 385/37 X |
| 4,476,161 | 10/1984 | Pohle et al. | 427/162 |
| 4,568,147 | 2/1984 | Seymour et al. | 359/566 |
| 4,745,607 | 5/1988 | Koch | 372/45 |
| 4,828,356 | 5/1989 | Hobrock et al. | 359/572 |
| 4,873,692 | 10/1989 | Johnson et al. | 372/20 |
| 4,914,665 | 4/1990 | Sorin | 372/20 |
| 5,022,730 | 6/1991 | Cimini et al. | 385/27 |
| 5,157,537 | 10/1992 | Rosenblatt | 359/245 |
| 5,216,680 | 6/1993 | Magnusson et al. | 385/37 X |
| 5,337,183 | 8/1994 | Rosenblatt | 359/248 |

FOREIGN PATENT DOCUMENTS

| | | |
|---|---|---|
| 3643704 | 6/1988 | Germany . |
| 3943387 | 7/1990 | Germany . |

OTHER PUBLICATIONS

Day and Magnusson, "Line Shape Symmetry Properties of Guided–Mode Resonance Filters," Optical Society of America Annual Meeting, Dallas, Texas, Oct. 2–7, 1994, Paper WQQ7.

Gale, "Diffraction, beauty and commerce," *Physics World*, pp. 24–28, Oct., 1989.

Gale et al., "Zero–order diffractive microstructures for security applications," SPIE, 1210:83–89, 1990. [No Month].

Gaylord et al. "Analysis and Applications of Optical Diffraction by Gratings," *Proceedings of the IEEE*, 73(5):894–937, May, 1985.

Hessel and Oliner, "A New Theory of Wood's Anomalies on Optical Gratings," *Applied Optics*, 4(10):1275–1298, Oct., 1965.

Magnusson and Wang, "Calculation of the Linewidths of Heavily Modulated Waveguide Grating Filters," Technical Digest of the Optical Society of America Annual Meeting, p. 26, Albuquerque, New Mexico, Sep. 20–25, 1992, Paper MCC7.

Magnusson and Wang, "Characteristics of Waveguide–grating Filters: Plane Wave and Gaussian Beam Illumination." Conference proceedings of the IEEE Lasers and Electro–Optics Society Annual Meeting, pp. 157–158, San Jose, California, Nov. 15–18, 1993.

(List continued on next page.)

*Primary Examiner*—John D. Lee

[57] ABSTRACT

Ideal or near ideal filter for reflecting or transmitting electromagnetic waves having wavelength range of approximately 100 nm to 10 cm are disclosed. These filters combine a dielectric multilayer structure with a resonant waveguide grating and they are valid for both TE and TM polarized waves. High efficiency, arbitrarily narrow band, polarized, filters with low sidebands over extended wavelength ranges can be obtained.

29 Claims, 27 Drawing Sheets

OTHER PUBLICATIONS

Magnusson and Wang, "Design of Ideal Reflection Filters Using Resonant Waveguide Gratings," Topical Meeting on Diffractive Optics: Design, Fabrication, and Applications, Rochester, New York, Jun. 6–8, 1994, pp. 256–259.

Magnusson and Wang, "Design Relations for Resonant Waveguide Grating Filters," Technical Digest of the Optical Society of America Annual Meeting, pp. 184–185, Toronto, Canada, Oct. 3–8, 1993.

Magnusson and Wang, "Filter Properties of Dielectric Waveguide Gratings," Technical Digest of the Topical Meeting on Diffractive Optics: Design, Fabrication, and Applications, pp. 47–49, New Orleans, Louisiana, Apr. 13–15, 1992.

Magnusson and Wang, "New Principle for Optical Filters," *Applied Physics Letters*, 61:1022–1024, Aug. 1992.

Magnusson and Wang, "Optical devices based on the resonance properties of waveguide gratings," *Abstract*, OSA Annual Meeting, Session Optoelectronics, Nov. 6, 1991, Paper WD2.

Magnusson and Wang, "Optical Filter Elements Based on Waveguide Gratings," Proceedings of the SPIE: Holographics International '92, vol. 1732, pp. 7–18 SPIE–The International Society for Optical Engineering, London, England, Jul. 27–29, 1992.

Magnusson and Wang, "Optical Waveguide–grating Filters," Proceedings of the SPIE: International Conference on Holography, Correlation Optics, and Recording Materials, vol. 2108, pp. 380–391, SPIE–The International Society for Optical Engineering, Chernovtsy, Ukraine, May 10–14, 1993 (invited).

Magnusson and Wang, "Resonances of slanted dielectric diffraction gratings in asymmetric waveguide geometry," *Abstract*, OSA Annual Meeting, Joint OSA/LEOS Session on Integrated Optoelectronics:3, Nov. 9, 1990, Paper FJJ4.

Magnusson and Wang, "Theory and Applications of Guided–Mode Resonance Filters," *Applied Optics*, 32(14):2606–2613, May, 1993.

Magnusson and Wang, "Thin–Film Transmission and Reflection Optical Filters with Modulated Layers," Optical Society of America Annual Meeting, Dallas, Texas, Oct. 2–7, 1994, Paper WQQ6.

Magnusson and Wang, "Transmissive and Reflective Optical Bandbass Filters Using Guided–mode Resonance Effects," Conference on Lasers and Electro–Optics/Europe, 1994 Technical Digest; p. 178, Aug. 28–Sep. 2, 1994, Amsterdam, Holland, Paper CTuR4.

Magnusson et al., "Resonance Properties of Dielectric Waveguide Gratings: Theory and Experiments at 4–18 GHz," *IEEE Transactions on Antennas and Propagation*, 42:567–569, Apr., 1994.

Marcuse, "Guided Modes of the Asymmetric Slab Waveguide," *In: Theory of Dielectric Optical Waveguides*, Academic Press, Inc. (London) Ltd., pp. 9–10, 1974. [No Month].

Moharam and Gaylord, "Rigorous coupled–wave analysis of planar–grating diffraction," *J. Opt. Soc. Am.*, 71(7):811–818, Jul. 1981.

Nevière, "The Homogeneous Problem," *In: Electromagnetic Theory of Gratings*, R. Petit, ed., Springer–Verlag, Ch. 5, pp. 123–157, 1980. [No Month].

Tamir, "Inhomogeneous Wave Types at Planar Interfaces: III – Leaky Waves," *Optik*, 38(3):269–297, 1973. [No Month].

Tamir, "Inhomogeneous Wave Types at Planar Interfaces: II – Surface Waves," *Optik*, 37(2):204–228, 1973. [No Month].

Tamir, "Scattering of Electromagnetic Waves by a Sinusoidally Stratified Half–Space: II. Diffraction Aspects at the Rayleigh and Bragg Wavelengths," *Canadian Journal of Physics*, 11:2461–2494, 1966. [No Month].

Wang and Magnusson, "Approximate Analytical Solutions of the Rigorous Coupled–Wave Equations: Application to Resonant Waveguide Filters," Technical Digest of the Optical Society of America Annual Meeting, p. 185, Toronto, Canada, Oct. 3–8, 1993.

Wang and Magnusson, "Design of Waveguide–Grating Filters with Symmetrical Line Shapes and Low Sidebands," *Optics Letters*, 19:919–921, Jun., 1994.

Wang and Magnusson, "Guided–mode resonance properties of dielectric strip gratings," *Abstract*, OSA Annual Meeting, Joint OSA/LEOS Session on Integrated Optoelectronics:3, Nov. 9, 1990, Paper FJJ5.

Wang and Magnusson, "Multilayer Waveguide–Grating Filters," *Applied Optics*, 34(14):2414–2420, May 1995.

Wang and Magnusson, "Multilayer Waveguide–Grating Reflection Filters," Optical Society of America Annual Meeting, Dallas, Texas, Oct. 2–7, 1994, Paper WQQ8.

Wang and Magnusson, "Resonance anomalies of dielectric–layered diffraction gratings for TE and TM polarized incident waves," *Abstract*, OSA Annual Meeting, Session on Diffractive Optical Elements:2, Nov. 7, 1991, Paper ThBB3.

Wang and Magnusson, "Resonances of Asymmetric Dielectric Waveguides Containing a Diffraction Grating," *IEEE Antennas and Propagation International Symposium Digest*, 1:420–424, 1990. [No Month].

Wang and Magnusson, "Resonance Properties of Waveguide Grating Filters Under Gaussian Beam Illumination," Conference on Lasers and Electro–Optics, 1993 Technical Digest Series, vol. 11, pp. 566–569, May 2–7, 1993, Baltimore, Maryland.

Wang et al., "Analysis of the polarization properties of waveguide gratings at resonance," Technical Digest of the Optical Society of America Annual Meeting, p. 42, Albuquerque, New Mexico, Sep. 20–25, 1992, Paper MRR5.

Wang et al., "Guided–Mode Resonances in Planar Dielectric–Layer Diffraction Gratings," *Journal of the Optical Society of America A*, 7:1470–1474, Aug., 1990, vol. 7, No. 8.

Wang et al., "Waveguide mode–induced resonances in planar diffraction gratings," *Abstract*, Optical Society of America Annual Meeting, p. 117, Orlando, Florida, Oct. 15–20, 1989, Paper TULL4.

Zhang, "Spatial modifications of Gaussian beams diffracted by reflection gratings," *J. Opt. Soc. Am. A*, 6(9):1368–1381, Sep., 1989.

EFFICIENT BANDPASS REFLECTION AND TRANSMISSION FILTERS WITH LOW SIDEBANDS BASED ON GUIDED-MODE RESONANCE EFFECTS

BACKGROUND OF THE INVENTION

1. Field of the Invention

This invention relates to guided-mode resonance filters for producing efficient bandpass reflection and transmission with low sidebands.

2. Brief Description of the Relevant Art

Methods of dispersing wave energy are known in the art. In particular, spatially periodic elements, such as gratings, have been used to diffract wave energy, e.g., such as light incident on the element. Diffraction gratings can be used to influence the amplitude, phase, direction, polarization, spectral composition, and energy distribution of the electromagnetic wave. Examples of classical applications of gratings include deflection, coupling, filtering, multi-plexing, guiding, and modulation of optical beams in areas such as holography, integrated optics, optical communications, acousto-optics, nonlinear optics, and spectroscopy.

In general, the efficiency of a grating varies smoothly from one wavelength to another. However, there can be localized troughs or ridges in the efficiency curve and these are observed as rapid variations in efficiency with a small change in either wavelength or angular incidence. These troughs or ridges are sometimes called "anomalies." From the point of view of a spectroscopist, anomalies are a nuisance because they introduce various peaks and troughs into the observed spectrum. It is, therefore, very important that the positions and shapes of the anomalies be accurately predicted as well as the conditions under which they appear. However, as the present invention indicates, these "anomalies" may be employed to carry out some very useful purposes.

Guided-mode resonance effects in waveguide gratings generate sharp variations in the intensity of the observable propagating waves. This resonance results from evanescent diffracted waves that are parametrically near to a corresponding leaky mode of the waveguide grating. Because the propagating and evanescent diffracted waves of gratings are both coupled to the adjacent orders, a resonance in an evanescent wave can cause a redistribution of the energy in propagating waves. For high-efficiency resonance effects, the grating filters can be designed to admit only zero-order forward- and backward-propagating waves with primary contributions from the +1 and/or −1 order evanescent-wave resonances. At resonance, the diffraction efficiency of the forward-propagating wave approaches zero, and that of the backward wave tends to unity. Features of this guided-mode resonance effect, such as high-energy efficiency and narrow linewidth, may lead to applications in laser filtering technology, integrated optics, and photonics.

In 1965, Hessel and Oliner presented a mathematical model that analyzed reflection anomalies occurring at both the resonance and the Rayleigh wavelengths for a given equivalent surface reactance. [A. Hessel and A. A. Oliner, "A New Theory of Woods Anomalies" Appl. Opt., vol. 4, pp. 1275–1298, 1965.] Since then, others have studied grating anomalies and resonance phenomena on surface-relief gratings and corrugated dielectric waveguides. Many potential applications based on the narrow-line reflection filter behavior of the fundamental, planar waveguide grating structure have been described. [S. S. Wang and R. Magnusson, "Theory and applications of guided-mode resonance filters," Applied Optics, Vol. 32, pp. 2606–2613, 1993; S. S. Wang and R. Magnusson, "Multilayer waveguide-grating filters," Applied Optics, Vol. 34, pp. 2414–2420, 1995.]

Some of the above problems were addressed by Magnusson al., U.S. Pat. No. 5,216,680 through the use of an optical guided-mode resonance filter. This filter provided predictable anomalous effects such that an accurate passband having known diffraction efficiency could be designed. However, this patent did not address the elimination of the filter sidebands. Furthermore, this patent did not address transmissive filters.

SUMMARY OF THE INVENTION

An ideal or near ideal reflective filter having no or very low sidebands is achieved in the present invention by combining classical antireflection (AR) effects of thin-film structures with guided-mode resonance effects of waveguide gratings leading to efficient, symmetrical, polarized, reflection filters with low sidebands over a wavelength range determined by the set of thin-film anti-reflection layers used. More specifically, a spatial periodic structure such as a waveguide grating layer is incorporated in a thin-film, anti-reflective, dielectric material.

Applications include bulk laser resonator, frequency-selective, polarizing mirrors, laser cavity tuning elements, electro-optical modulators and switches, mirrors and phase locking elements for vertical-cavity surface emitting laser arrays, spectroscopic sensor elements, and display panel pixels.

The ideal or near ideal, multiple-layer, guided-mode, reflection, resonance filter of the present invention consists of:

1) An arbitrary number of unmodulated layers (i.e. homogenous) made of dielectric material. Each layer having a thickness near either ¼ or ½ of the resonance wavelength of the input wave.

2) An arbitrary number of modulated layers (i.e. gratings) each arbitrarily ordered in the multilayer stack and adjacent to the unmodulated layers. Each modulated layer also has a thickness near either ¼ or ½ of the resonance wavelength.

3) At least one layer either modulated or unmodulated must have a a permittivity greater than both the substrate permittivity and the cover permittivity.

The modulated layer(s) may contain any spatially periodic structure such as sinusoidal, square, etc. In the preferred embodiment, the modulated layer has a grating period smaller than the resonance wavelength.

In the present invention, an ideal or near ideal transmission filter may be created by placing the waveguide grating layer in a thin-film, high-reflectance mirror stack. This is accomplished by utilizing the transmission peak corresponding to the resonance minimum in the reflection curve and integrating the resonant structure into a multi-layer, thin-film, high-reflectance design. The resultant transmission bandpass filter has high transmission efficiency and a symmetrical response with low sideband transmissivity.

In the transmission filter, the basic element is a thin-film, high/low permittivity, quarter-wave pair that is highly reflective in the absence of resonance effects. In usual thin-film design, both are homogeneous layers. For guided-mode resonance based design, either layer can be modulated or both can be modulated. The filter may consist of several double-layer pairs placed between the substrate and the cover.

In the present invention, an ideal or near ideal, multiple-layer, guided-mode, transmission, resonance filter consists of:

1) An arbitrary number of unmodulated layers (i.e. homogenous) made of dielectric material. Each layer having a thickness near either ¼ or ½ of the resonance wavelength of the input wave.
2) An arbitrary number of modulated layers (i.e. gratings) each arbitrarily ordered in the multilayer stack and adjacent to the unmodulated layers. Each modulated layer also has a thickness near either ¼ or ½ of the resonance wavelength.
3) At least one layer either modulated or unmodulated has a permittivity greater than both the substrate permittivity and the cover permittivity.
4) The permittivities of all layers alternate from high to low beginning with the layer nearest the cover being high.

As with the reflective filter, the modulated layer(s) of the transmission filter may contain any spatially periodic structure such as sinusoidal, square, etc. In the preferred embodiment, the modulated layer has a grating period smaller than the resonance wavelength. The total number of layers may be odd or even.

It will be apparent that a person of skill in the art, having the benefit of this disclosure of this invention, may conceive of numerous other applications for which this invention will be beneficial. Nothing in this disclosure limits the application of the invention herein to the embodiments and the applications expressly described herein.

DETAILED DESCRIPTION OF THE PREFERRED EMBODIMENTS

So that the manner in which the above recited advantages and features of the present invention, as well as others which will become apparent, are attained and understood in detail, a more particular description of the invention summarized above may be had by reference to a preferred embodiment thereof which is illustrated in the appending drawings, which drawings form a part of this specification.

Figure 1:
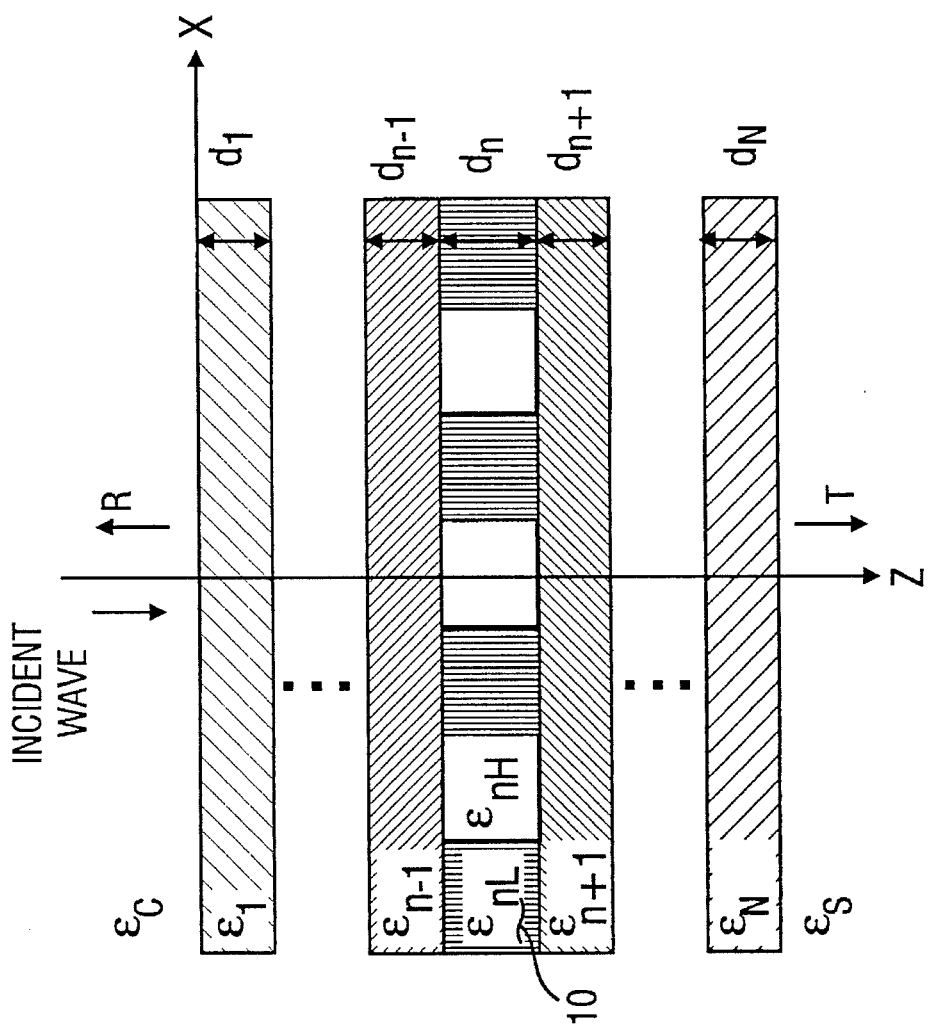
FIG. 1 is a cross-sectional view of a multi-layer reflection filter according to the present invention.

It is to be noted, however, that the appended drawings illustrate only typical embodiments of the invention and are therefore not to be considered limiting of its scope, for the invention may admit to other equally effective embodiments all within the spirit and scope of the claims appended hereto.
Reflection Filters Referring first to FIG. 1, this embodiment of the present invention includes multiple-layers at least one of which is a grating 10 (for clarity only one is depicted). For a grating in the $n^{th}$ layer, its thickness is $d_n$ with alternating relative permittivities $\epsilon_{nL}$ and $\epsilon_{nH}$ (i.e. $\epsilon_{nH} > \epsilon_{nL}$).

This multi-layer waveguide grating structure possesses N thin-film layers with at least one of these being a grating. The grating has a square-wave (depicted), sinusoidal, or other spatially periodic structure and a grating period $\Lambda$ that is typically sufficiently small ($\Lambda < \lambda_r$, where $\lambda_r$ is the resonance wavelength of the input wave) so that only the zero-orders propagate; thus in FIG. 1 no higher-order diffracted waves are shown at normal incidence. The embodiment shown in FIG. 1 contains an arbitrary number of arbitrarily ordered modulated and unmodulated thin-film layers. If more than one grating is present, these can be arbitrarily spatially shifted relative to each other and have different grating periods.

For a single-layer resonance structure, the eigenvalue equation for the equivalent unmodulated dielectric waveguide has been found useful to predict the approximate resonance location of the waveguide grating. For guided-mode resonance effects of multi-layer waveguide gratings to be considered a proper multi-layer waveguide eigenvalue equation must be used. This simple resonance equation gives the resonance wavelength as a function of grating period, layer thickness, angle of incidence, and the average relative permittivities in the structure.

The eigenvalue equation of multi-layer, waveguide films situated between a substrate and a cover can be converted to a multi-layer resonance equation. The component of the propagation constant along the boundary is:

$$\beta_n = k \sqrt{\epsilon_n} \sin\theta_n \quad (1)$$

where $k = 2\pi/\lambda$, $\lambda$ is the wavelength in free space, $\epsilon_n$ is the relative permittivity of layer n (n=1,2, ... ), and $\theta_n$ is the angle of refraction in the n-th layer.

For each $\beta_n$, the corresponding values of $P_n$, $P_c$, and $P_s$ can be defined as:

$$P_n = [\epsilon_n - (\beta_n/k)^2]^{1/2} \quad (2)$$

$$P_c = [\epsilon_c - (\beta_n/k)^2]^{1/2} \quad (3)$$

$$P_s = [\epsilon_s - (\beta_n/k)^2]^{1/2} \quad (4)$$

where $\epsilon_c$ and $\epsilon_s$ are the relative permittivities of cover and substrate, respectively. Further, we define:

$$\gamma_n = k d_n [\epsilon_n - (\beta_n/k)^2]^{1/2} \quad (5)$$

where $d_n$ is the thickness of the $n^{th}$ layer. The elements of the characteristic matrix of the $n^{th}$ layer are, then, given as:

$$m_{11,n} = \cos\gamma_n \quad (6)$$

$$m_{12,n} = -j \sin\gamma_n / P_n \quad (7)$$

$$m_{21,n} = -j P_n \sin\gamma_n \quad (8)$$

$$m_{22,n} = \cos\gamma_n \quad (9)$$

where $j = \sqrt{-1}$. The total characteristic ABCD matrix of an N-layer structure is the product of the individual layer characteristic matrices consecutively $$\begin{bmatrix} A & B \\ C & D \end{bmatrix} = \begin{bmatrix} m_{11,1} & m_{12,1} \\ m_{21,2} & m_{22,2} \end{bmatrix} \begin{bmatrix} m_{11,2} & m_{12,2} \\ m_{21,2} & m_{22,2} \end{bmatrix} \cdots \begin{bmatrix} m_{11,N} & m_{12,N} \\ m_{21,N} & m_{22,N} \end{bmatrix} \quad (10)$$

Since this ABCD matrix provides a relationship between the electric fields in the cover and substrate, the reflected ($E_{r0}$) and transmitted ($E_{t0}$) electric field intensities at the upper- and lower-boundaries of the multi-layer stack are obtained as:

$$\begin{bmatrix} -1 & A + BP_s \\ P_c & C + DP_s \end{bmatrix} \begin{bmatrix} E_{r0} \\ E_{t0} e^{jk_s \cos\theta_t Z_N} \end{bmatrix} = \begin{bmatrix} E_{i0} \\ P_c E_{i0} \end{bmatrix} \quad (11)$$

where $$k_s = 2\pi \sqrt{\epsilon_s} / \lambda,$$

$\theta_t$ is the angle of transmission in the substrate, and $Z_N$ is the multi-layer thickness at the lower-boundary.

If the incident intensity $E_{i0}$ were to vanish, a nontrivial solution of Eq. (11) satisfying the boundary conditions can be found provided that the determinant of the coefficient matrix equal zero.

The eigenvalue equation of the multi-layer waveguide is then, $$P_c A + P_c P_s B + C + P_s D = 0 \quad (12)$$

This is the dispersion relation for waveguide modes that can be supported by the multi-layer stack. Further, the diffraction grating equation can be represented as:

$$\beta_i / k = \sqrt{\epsilon_n} \sin\theta_n - i\lambda/\Lambda \quad (13)$$

where i is the integer number labeling the diffracted orders (i=0, ±1, ±2, ... ), and $\Lambda$ is the grating period.

The resonance-location equation of multi-layer waveguide grating structures is then obtained by substituting Eq. (13) into Eqs. (1)–(5) for $\beta_n/k$ and by substituting $\epsilon_{n,eff}$ for $\epsilon_n$ where $\epsilon_{n,eff} = (\epsilon_{nH} + \epsilon_{nL})/2$ is the average permittivity of the $n^{th}$ rectangular grating layer. If the value of the modulation index $(\epsilon_{nH} - \epsilon_{nL})/(\epsilon_{nH} + \epsilon_{nL})$ is relatively small, guided-mode resonances occur near the parameter values predicted by Eq. (12). The range condition for allowed guided-mode resonances is:

$$\max\{\sqrt{\epsilon_c}, \sqrt{\epsilon_s}\} \leq \beta_i/k < \max\{\sqrt{\epsilon_{n,eff}} \mid n = 1,2,3,... \} \quad (14)$$

This condition shows that the permittivity of at least one of the interleaved layers must be higher than that of the substrate and cover.

The multi-layer eigenvalue resonance equation is a simple expression useful to approximate the resonance locations in wavelength, grating thickness, or other parameters. The exact locations along with the lineshapes, linewidths, and efficiencies of the resonance response of the multi-layer waveguide grating structure are determined numerically using rigorous coupled-wave theory.

For non-resonance wavelengths the thin-film effects dominate because little coupling exists between the external propagating waves and the adjacent evanescent waves. At the resonance wavelength $\lambda_r$, however, the guided-mode resonance dominates the thin-film effects because there are strong couplings between the external propagating waves and the adjacent evanescent waves. At resonance the diffraction efficiency of the forward-propagating wave approaches zero, and that of the backward wave tends to unity.

For a rigorous analysis and development of these theories see Magnusson et al. U.S. Pat. No. 5,216,680 and S. S. Wang and R. Magnusson, "Multi-layer Waveguide Grating Filters," Applied Optics, vol. 34, No. 14, 2414–2420 (May 10, 1995).

Figure 2:
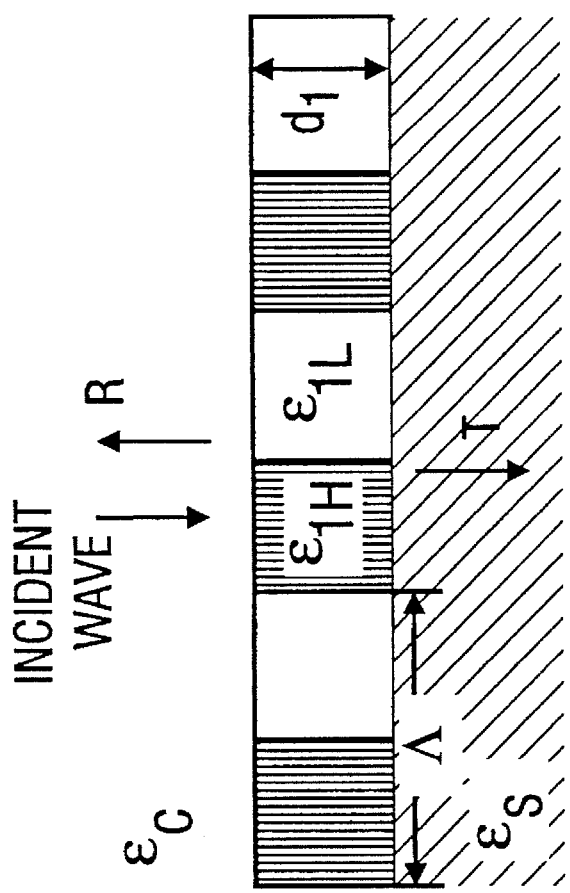
FIG. 2 is a cross-sectional view of a single-layer reflection filter according to the present invention.

Referring to FIG. 2, this particular embodiment of the present invention includes a single-layer which is a waveguide grating 10 having alternating permittivities $\epsilon_{1L}$, $\epsilon_{1H}$, a thickness $d_1$, and a grating period, $\Lambda$. The waveguide grating 10 is surrounded on the top side by a cover 20 with a permittivity $\epsilon_c$ and on the lower side by a substrate 30 with a permittivity $\epsilon_s$. The incident wave 40 approaches the waveguide grating 10 and has a resonance wavelength of $\lambda_r$. The permittivity of the waveguide grating must be greater than the permittivities of both the cover and substrate (i.e. $\epsilon_1 > \epsilon_s, \epsilon_c$). The thickness of the waveguide grating is equal to one-half the resonance wavelength (i.e. $d_n = \lambda_r/2$).

If the multi-layer grating structure is reduced to a single-layer, the correct eigenvalue resonance equation is found from Eq. (12) as $$\tan(\kappa_i d_1) = \frac{\kappa_i(\gamma_i + \delta_i)}{\kappa_i^2 - \gamma_i \delta_i} \quad (15)$$

where, $$\kappa_i = (\epsilon_{1,eff} k^2 - \beta_i^2)^{1/2}, \gamma_i = (\beta_i^2 - \epsilon_c k^2)^{1/2},$$

and $$\delta_i = (\beta_i^2 - \epsilon_s k^2)^{1/2},$$

with the corresponding range condition of, $$\max\{\sqrt{\epsilon_c}, \sqrt{\epsilon_s}\} \leq \beta_i/k < \sqrt{\epsilon_{1,eff}}. \quad (16)$$

A single-layer, waveguide grating filter obtains ideal or near-ideal filtering characteristics when its parameters are chosen such that it functions simultaneously as an anti-reflection (AR) thin-film coating and as a waveguide-mode resonance element. AR conditions require that the grating thickness be a multiple of a half resonance wavelength. That is, $$d_1 = m\lambda_r/4 \sqrt{\epsilon_{1,eff}}$$

where $$\epsilon_{1,eff} = (\epsilon_{1H} + \epsilon_{1L})/2$$

$\lambda_r$ is a resonance wavelength, and $$m=2,4,6,\ldots$$

Figure 2A:
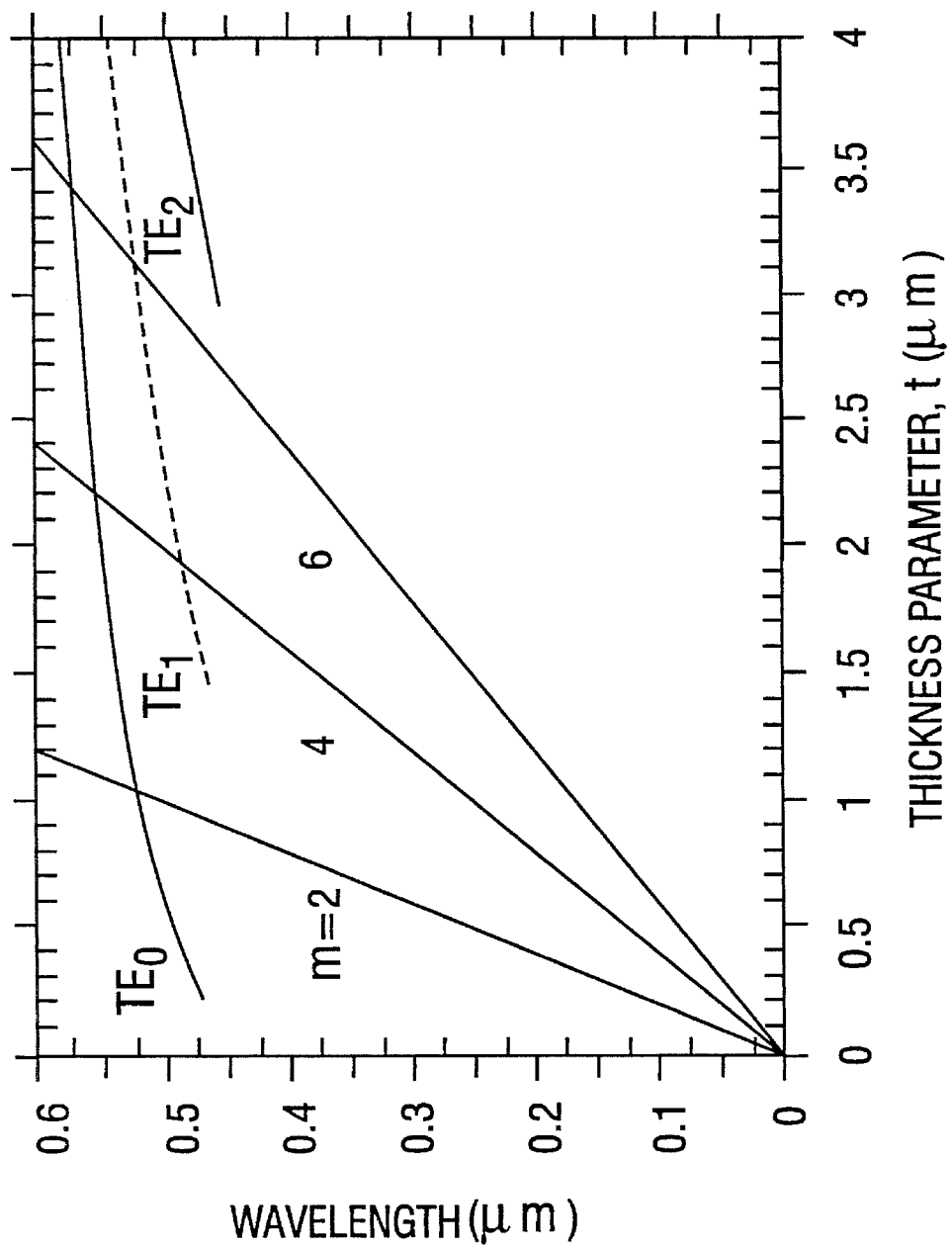
FIG. 2a is a graphical representation of the resonance-location relation for a single-layer reflection filter.
Figure 2B:
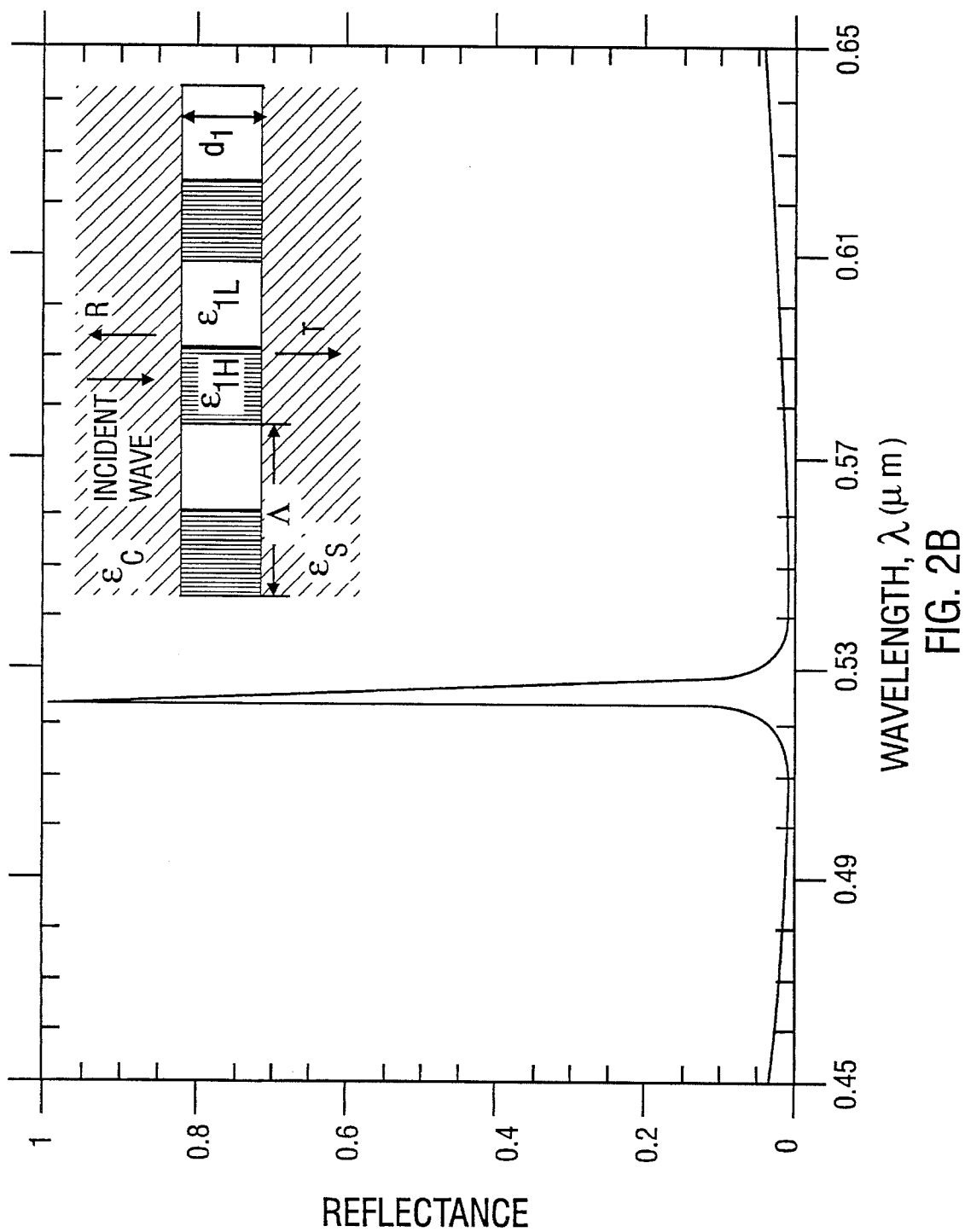
FIGS. 2b–2d are graphs depicting the TE (transverse electric) polarization spectral response of a single-layer reflection filter for various parameters according to the present invention.
Figure 2C:
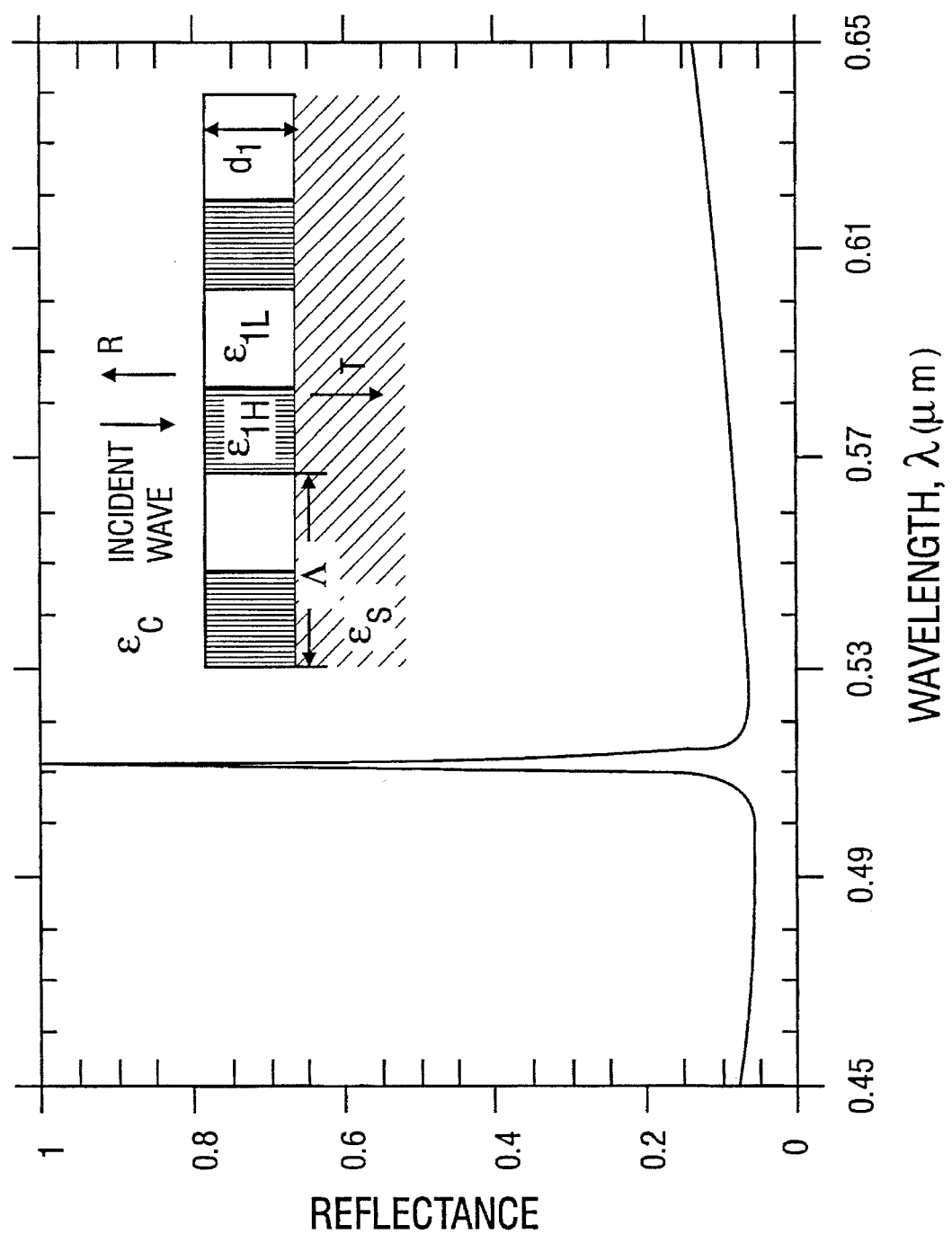
Figure 2D:
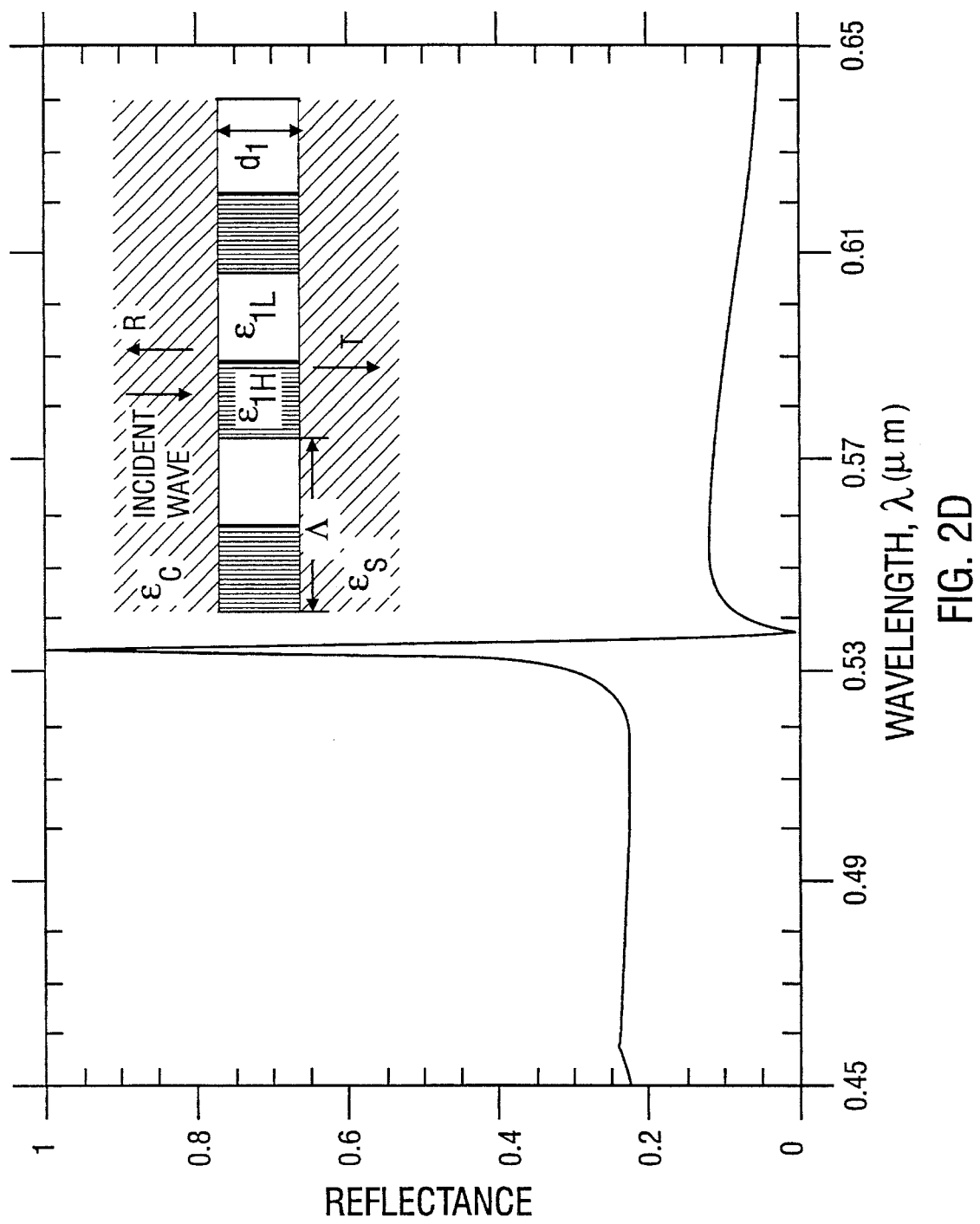

Additionally, AR conditions require that the waveguide geometry be symmetric with $\epsilon_c = \epsilon_s$. The approximate resonance wavelength can be found from the single-layer waveguide eigenvalue resonance equation, such as Eq. (15) based on the average permittivity of the waveguide grating. A graphical solution is given in FIG. 2a where the intercept points between the fundamental waveguide-mode resonance curve (TE$_0$) and the straight lines give the resonance wavelengths corresponding to the specific multiple $t=m\gamma$ of the half-wave grating thickness. The parameters are $\epsilon_c = \epsilon_s = 2.31$, $\epsilon_{1,eff} = 4.0$, $\Lambda = 300$ nm, and $\theta' = 0°$ (normal incidence). The reflection characteristic corresponding to the m=2 intercept is shown in FIG. 2b indicating a resonance filter with low symmetrical sidebands around the central resonance wavelength, $\lambda_r = 526$ nm. The grating thickness is obtained as $d_1 = 131$ nm (half wave) by using the graphical solution in FIG. 2a. This waveguide grating filter has a cover material with $\epsilon_c \neq 1$ and sidebands with less than 1% reflectance in an 80 nm range around the resonance. Since the single-layer AR design has a relatively narrow low-reflectance range, the half-wave thickness has to be determined near to the resonance wavelength. More practically, the filter will be operated in air resulting in $\epsilon_c \neq \epsilon_s$ and a corresponding higher reflectance in the sidebands as shown in FIG. 2c. If the filter thickness deviates from the half-wave thickness, the filter characteristic becomes asymmetrical with high sideband reflectance as exemplified in FIG. 2d. Additional flexibility in filter design is afforded by utilizing structures with two or more thin-film layers.

The approximate parameters needed to obtain a symmetrical line shape response from a guided-mode resonance filter are found by solving the transcendental resonance location equation with the grating thickness set equal to a multiple of a half wavelength. This approach is found valid for both TE and TM polarized waves. This approach yields approximate predictions of resonance wavelengths. The actual resonance locations are determined by the rigorous coupled-wave theory that solves the resonance waveguide grating equation exactly for nonzero grating modulation amplitudes.

Figure 3:
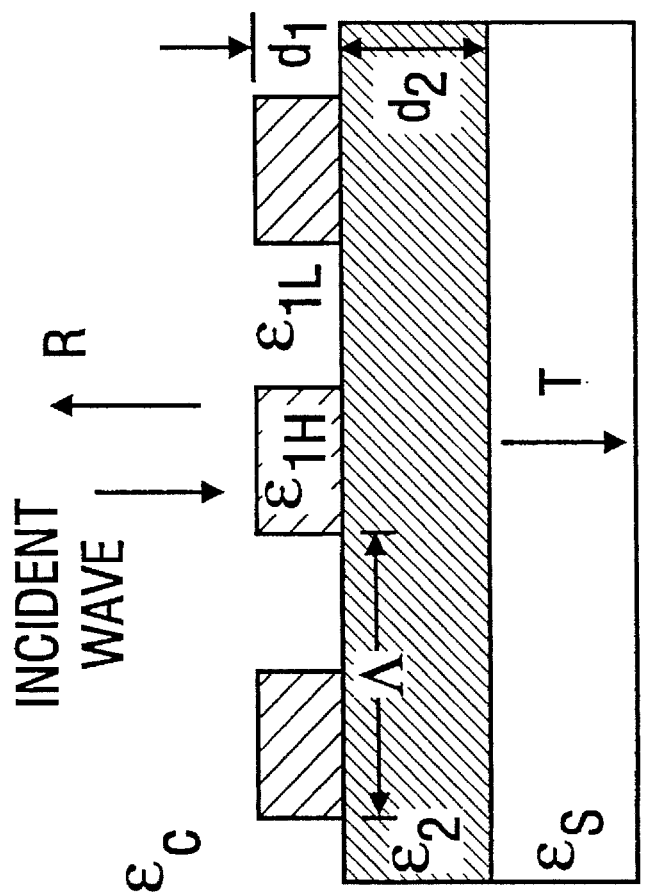
FIG. 3 is a cross-sectional view of a double-layer reflection filter according to this invention.

Referring now to FIG. 3 which depicts a double-layer reflection filter embodiment of the present invention. For the first example, the upper layer is chosen as the grating layer such that half of the rectangular grating material is the same as that in the second layer yielding a surface-relief waveguide grating filter. The design parameters are thus, $\epsilon_c = 1.0$, $\epsilon_s = 2.31$, $\epsilon_{1H} = 2.56$, $\epsilon_{1L} = 1.0$, $\epsilon_2 = 2.56$, $\Lambda = 300$ nm, and $\theta' = 0°$ (normal incidence). The relative permittivity of either of the two layers is larger than $\epsilon_c$ and $\epsilon_s$, see Eq. (14). Furthermore, the waveguide grating thickness and the thickness of region 1 may be chosen to equal either one-quarter or one-half of the resonance wavelength (i.e. $d_2 = \lambda_r/2$ or $\lambda_r/4$ and $d_1 = \lambda_r/4$).

Figure 3A:
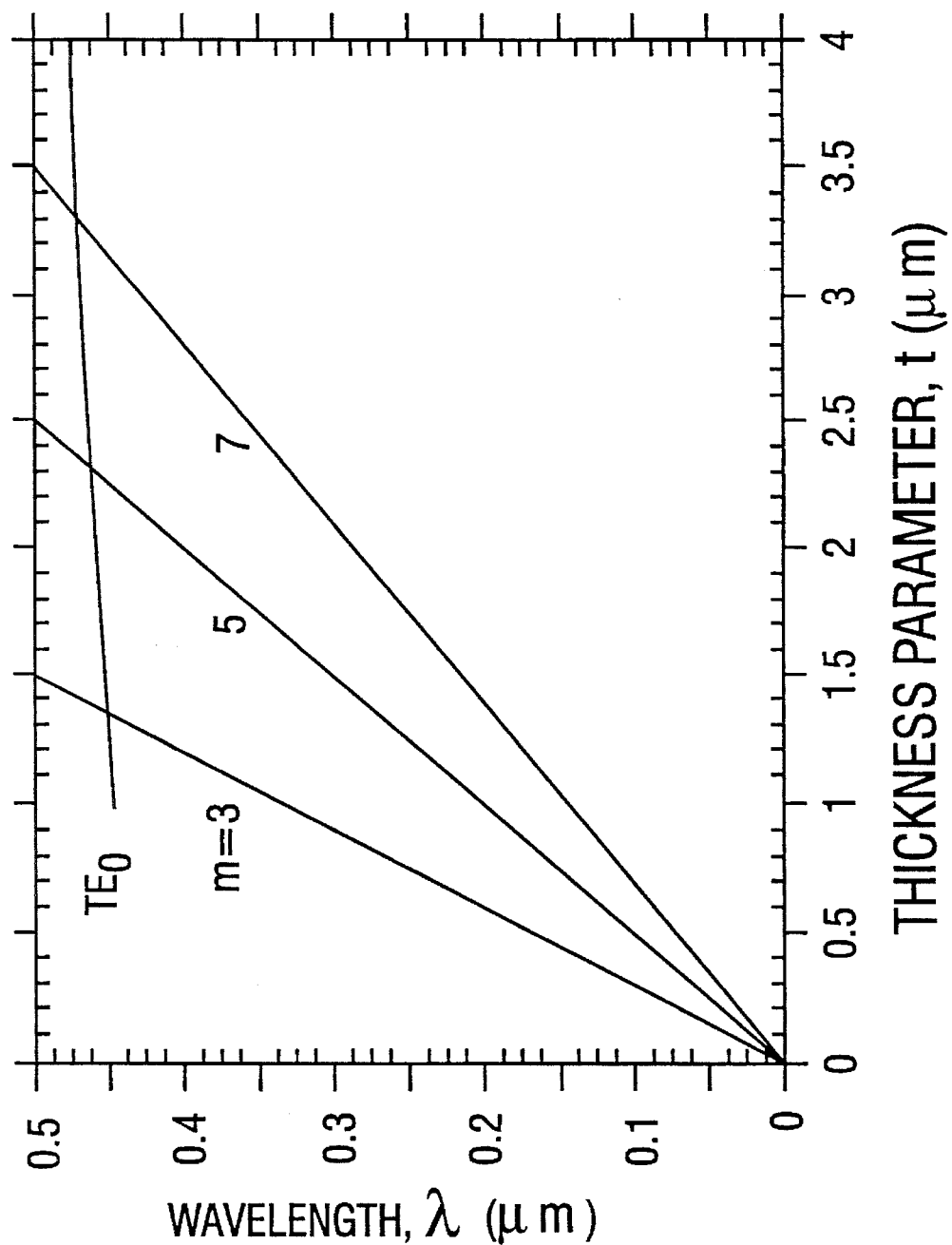
FIG. 3a is a graphical representation of the resonance-location relation for a double-layer reflection filter.

The corresponding resonance-location relation between the incident-wave wavelength and the layer thicknesses is illustrated in FIG. 3a. This is a double-layer, thin-film, AR layer set based on the unmodulated (i.e., average permittivity); each layer thickness is equal to $\epsilon_r = /4$. The fundamental resonance curve (TE$_0$) in this case, exhibits a small wavelength variation with respect to the thickness parameter, t, where, $$d_1 = t/4 \sqrt{\epsilon_{1,eff}} \text{ and } d_2 = t/4 \sqrt{\epsilon_2}$$

since the resonance condition Eq. (14) yields a narrow resonance wavelength range 456 nm<$\lambda_r$<480 nm. A resonance will occur near the interception points of the TE$_0$ curve and the straight lines that represents odd multiples of the quarter-wave thickness. At these points the quarter-wave AR design concept holds which means:

$$d_1 = m\lambda_r/4 \sqrt{\epsilon_{1,eff}},$$

$$d_2 = m\lambda_r/4 \sqrt{\epsilon_2},$$

and m=3, 5, .7, . . . .

Figure 3B:
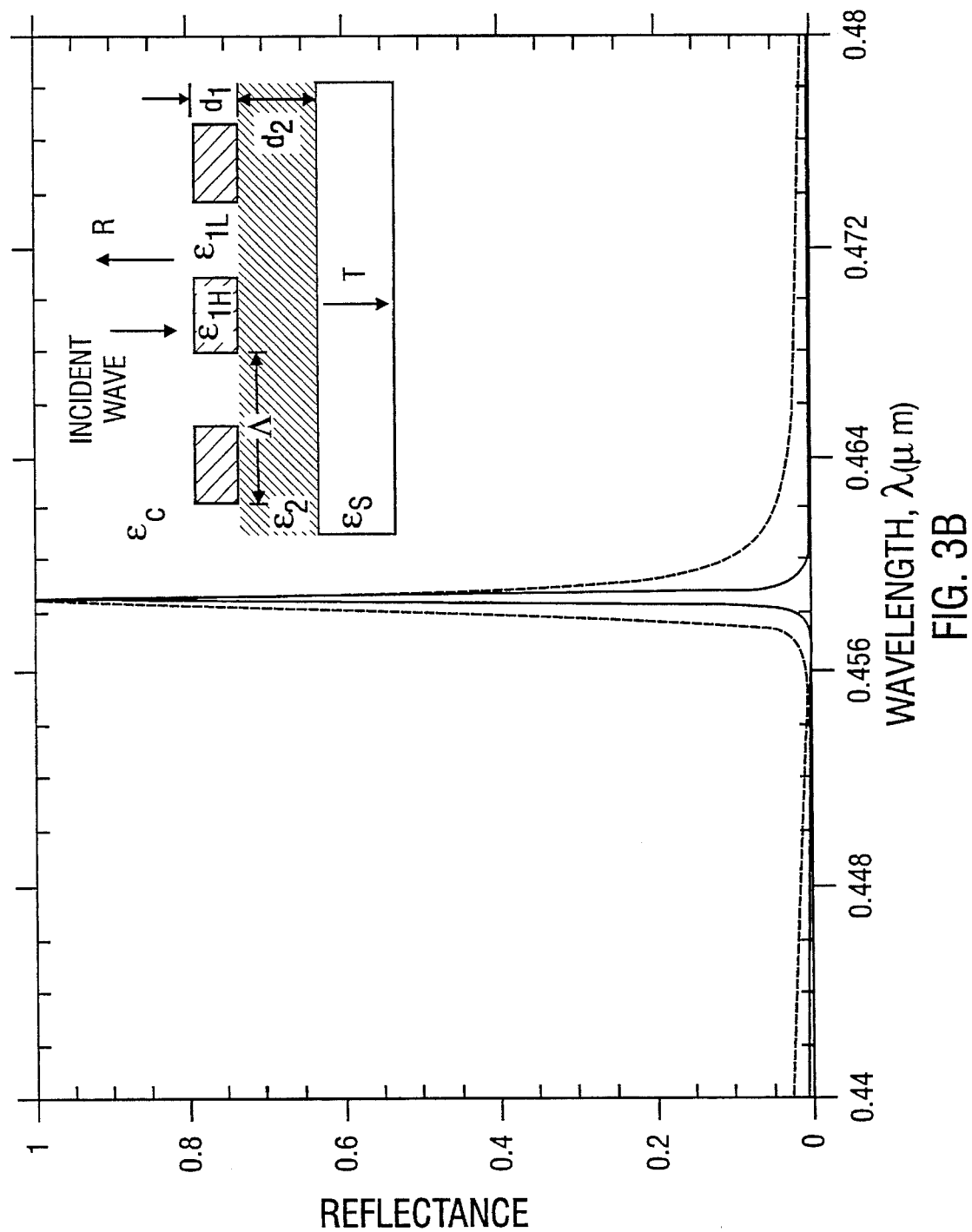
FIG. 3b is a graph depicting the TE polarization spectral response of a double-layer reflection filter according to the present invention.

The first intersection occurs at m=3 as shown in FIG. 3a. This is due to relatively weak waveguide confinement (effective waveguide index is $1.52 \leq N_g < 1.6$ in this example) requiring thicker waveguide layers than that with m=1. In FIG. 3b a dashed line shows the resonance response with AR design and $d_n = 256$ nm and $d_2 = 213$ nm. However, the response is asymmetrical with non-zero sidebands. This is because the modulation index, $(\epsilon_{1H} - \epsilon_{1L})/(\epsilon_{1H} + \epsilon_{1L}) = 0.44$, is too large to allow this heavily modulated layer to be accurately modeled with its average permittivity. Thus, the AR thin-film equivalent concept breaks down for this particular double-layer structure. If the modulation index is reduced by replacing $\epsilon_{1H} = 2.56$ by 1.85 and $\epsilon_{1L} = 1.0$ by 1.71, the modulation index $(\epsilon_{1H} - \epsilon_{1L})/(\epsilon_{1H} + \epsilon_{1L}) = 0.04$ is sufficiently small and the thin-film approximation is improved. A symmetrical line with low sidebands now obtains as shown by the solid curve in FIG. 3b. Thus, the smaller modulation index is seen to produce a narrower resonance line and to improve the AR characteristics. These two different cases share the same resonance wavelength location as it is primarily determined by the average relative permittivity $(\epsilon_{1H}+\epsilon_{1L})/2$ that is the same in both cases.

Figure 3C:
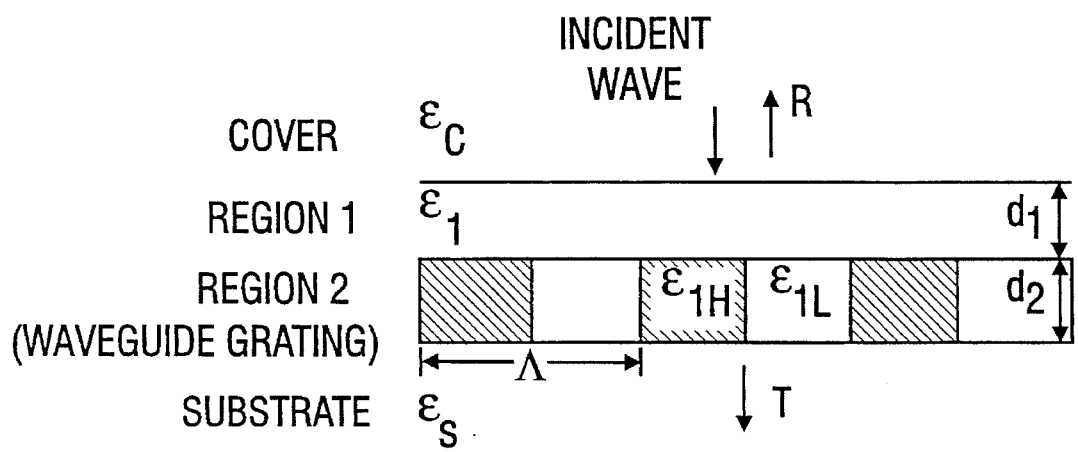
FIG. 3c is a cross-sectional view of a double-layer reflection filter according to this invention.
Figure 3D:
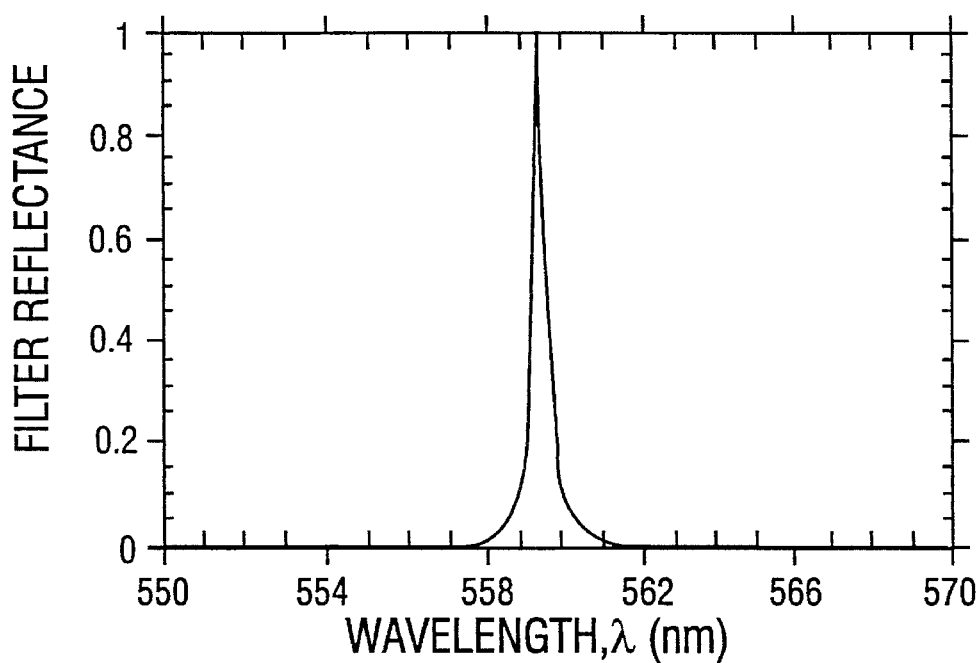
FIG. 3d is a graph depicting the TE polarization spectral response of a double-layer reflection filter according to the present invention.

Refer to FIGS. 3c and 3d for another embodiment of a double-layer reflective filter. The response shown in FIG. 3d has taken with $\epsilon_c=1.0$, $\epsilon_1=2.5$, $\epsilon_{2L}=3.6$, $\epsilon_{2H}=4.0$, $\epsilon_s=2.3$, $\Lambda=350$ nm, and layers are quarter resonance wavelength thick.

Figure 4:
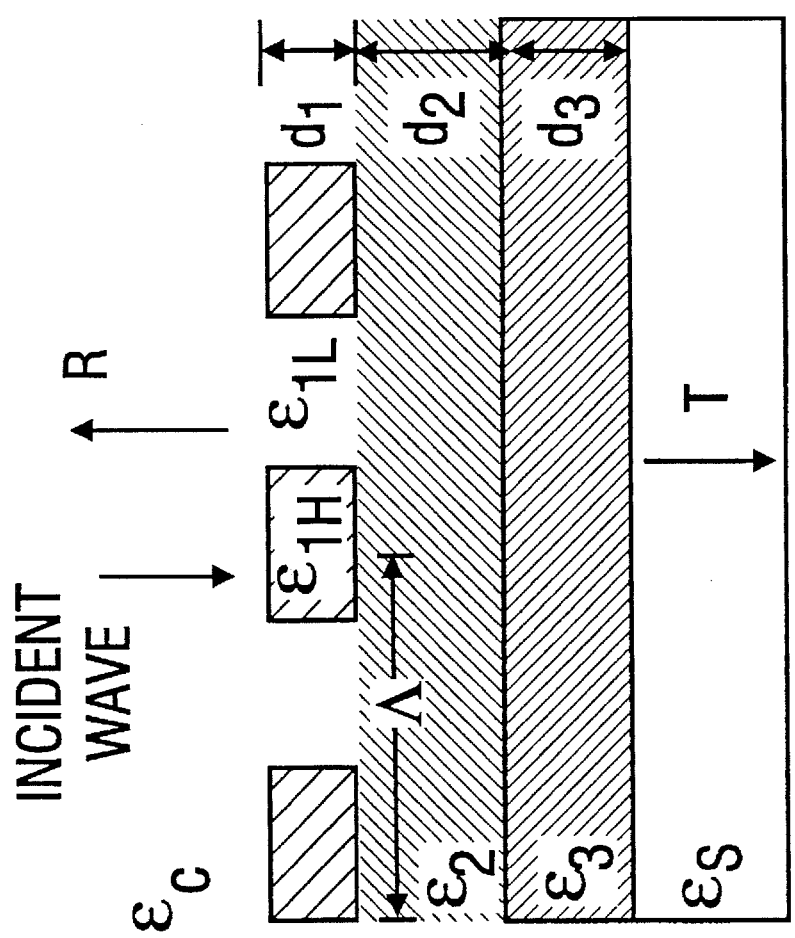
FIG. 4 is a cross-sectional view of a triple-layer reflection filter according to this invention.

Referring now specifically to FIG. 4 which depicts a triple-layer reflection filter. This particular embodiment is basically the same as that depicted in FIG. 3, which the addition of region three 30 on the underside of region two 20. Region three having a permittivity $\epsilon_3$ and a thickness $d_3$.

Figure 4A:
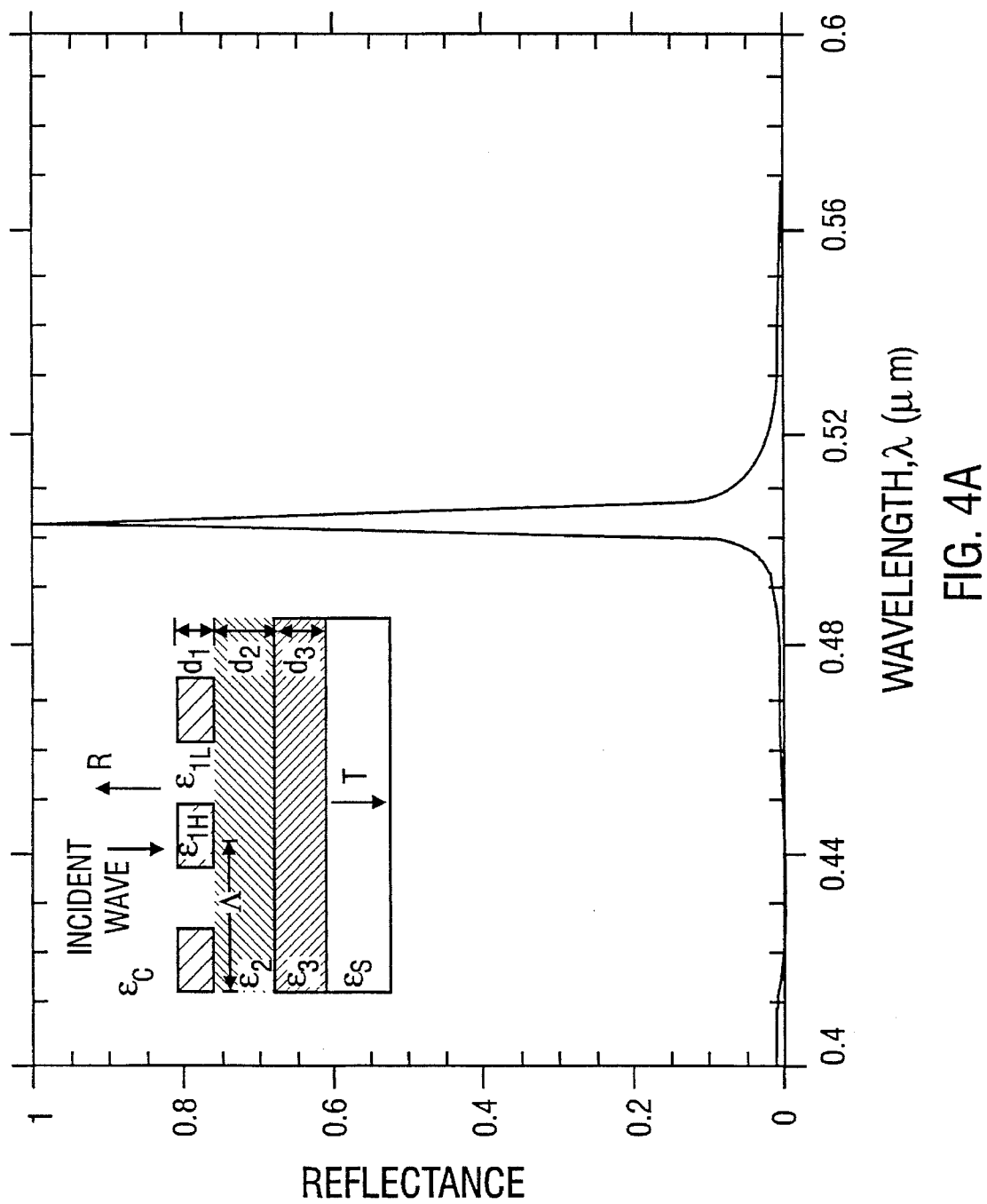
FIG. 4a is a graph depicting the TE polarization spectral response of a triple-layer reflection filter according to the present invention.

FIG. 4a depicts the TE polarization spectral response of a reflection filter built in accordance to FIG. 4 where $\epsilon_2=4.0$, and $\epsilon_3=3.42$ using the triple-layer AR condition $$\epsilon_{1,\text{eff}}^2 \epsilon_3^2 / \epsilon_2^2 = \epsilon_c \epsilon_s.$$

The range of the resonance is 456 nm$<\lambda_r<$600 nm according to Eq. (14). We use $\epsilon_{1H}=2.56$ and $\epsilon_{nL}=1.0$ as in the previous heavily-modulated, double-layer, surface-relief design case. This surface-relief waveguide grating structure yields an ideal reflection filter as shown in FIG. 4a in contrast with the asymmetrical lineshape (dashed line) in FIG. 3b. Since the resonance linewidth is determined by the magnitude of the modulation index and by the waveguide confinement, this triple-layer embodiment provides a broader linewidth than the double-layer embodiment due to the increased mode confinement provided by the high-index second layer.

Figure 5:
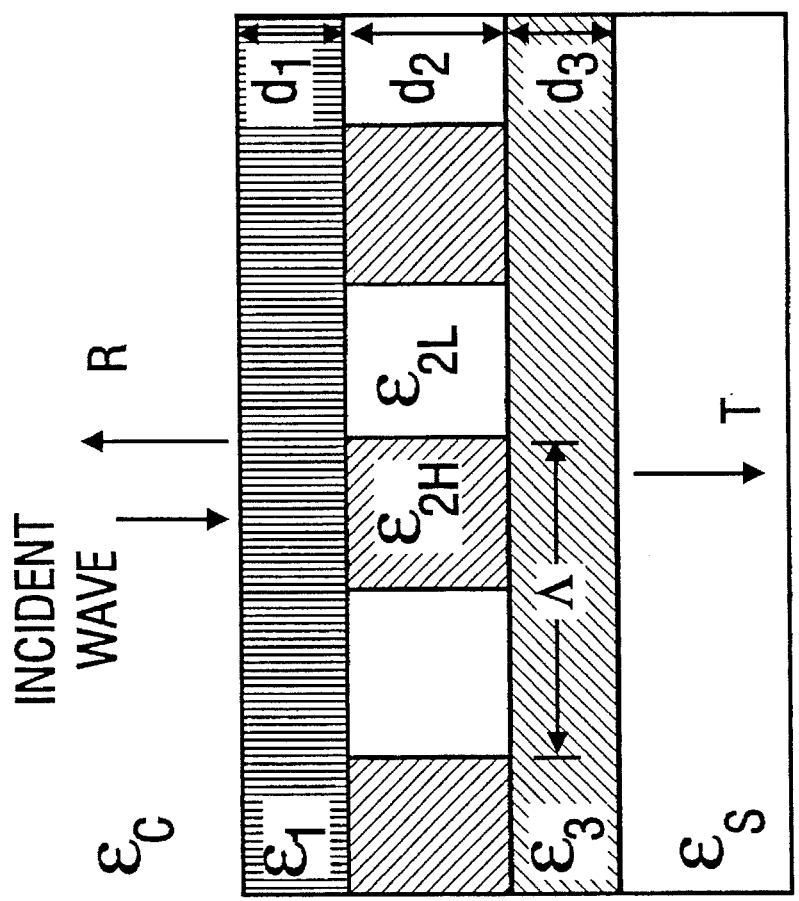
FIG. 5 is a cross-sectional view of a triple-layer reflection filter according to this invention.
Figure 5A:
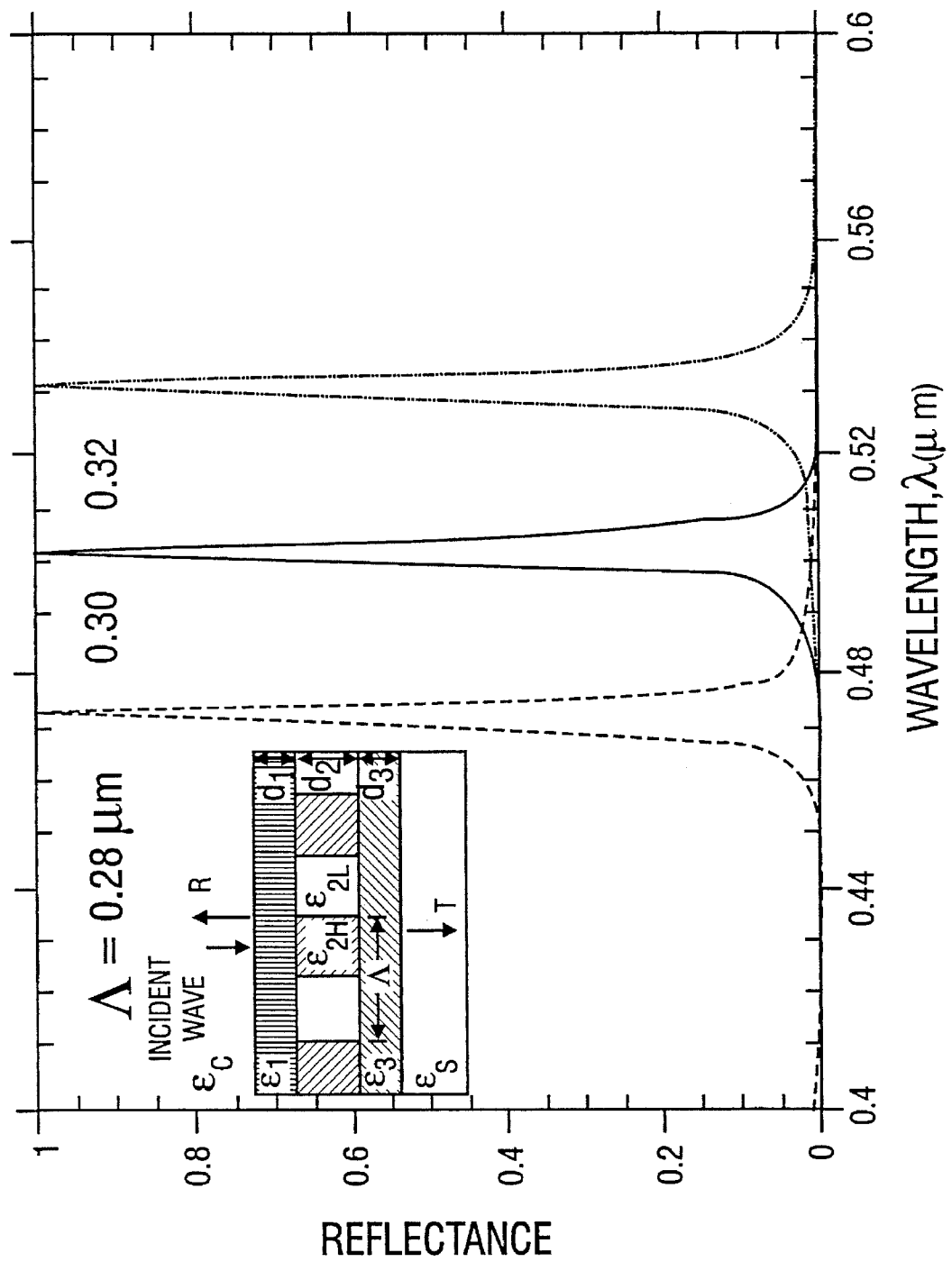
FIG. 5a is a graph depicting the TE polarization spectral response of a triple-layer reflection filter according to the present invention.

FIG. 5 depicts a triple-layer reflection filter in accordance with the present invention with the second layer 20 containing the grating and with the other two layers 10 and 30 being unmodulated. The average layer permittivities are the same as in the previous case. The resonance response is given by the solid line in FIG. 5a; it has the same resonance location as that in FIG. 4a. The parameters differ from the previous triple-layer design in that the grating layer relative permittivities are: $\epsilon_{2H}=4.75$ and $\epsilon_{2L}=3.24$. The resonance location can be shifted by changing the grating period from 280 nm to 320 nm in this case. Since the effective thin-film AR design is not sensitive to the grating period, shifting the resonance peak around within the AR region will not significantly affect the low sidebands determined by quarter-wave thicknesses at 500 nm wavelength as shown in FIG. 5a.

Figure 6:
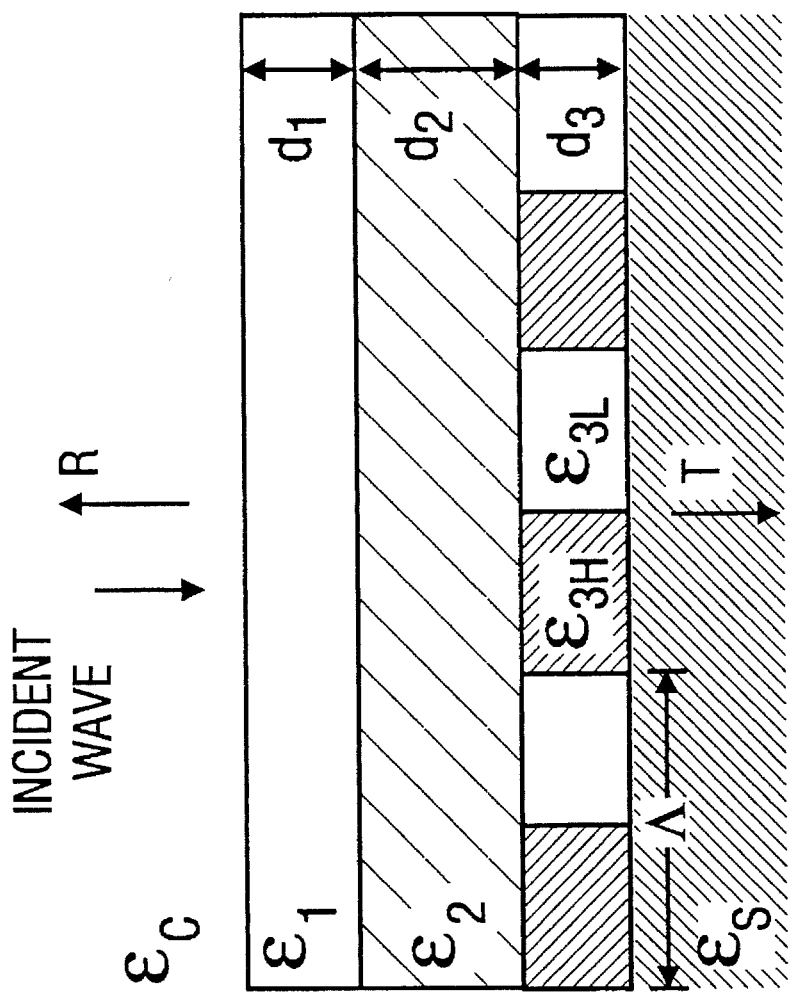
FIG. 6 is a cross-sectional view of a triple-layer reflection filter according to this invention.
Figure 6A:
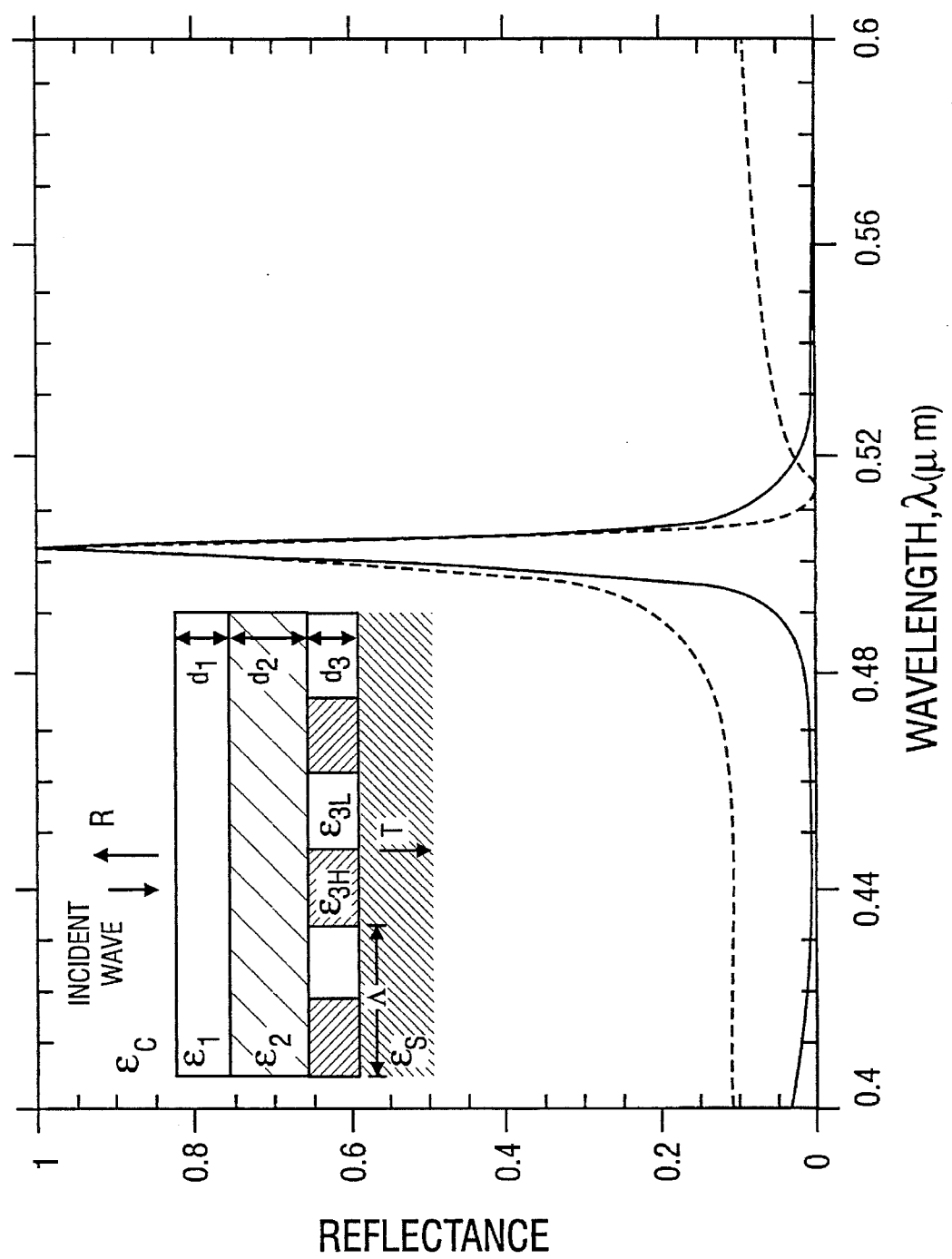
FIG. 6a is a graph depicting the TE polarization spectral response of a triple-layer reflection filter according to the present invention.

FIG. 6 depicts a triple-layer reflection filter in accordance with the present invention with the third layer 30 containing the grating with $\epsilon_{3H}=4.2$ and $\epsilon_{3L}=2.66$. Using an AR design with $d_1$, $d_2$, $d_3$ equal to $\lambda_r/4$, $\lambda_r/4$, $\lambda_r/4$, a symmetrical reflectance with low sidebands results as shown by the solid line in FIG. 6a. However, for a non-AR design where $d_1$, $d_2$, $d_3$ equal $\lambda_r/2$, $\lambda_r/4$, $\lambda_r/4$, an asymmetrical line with high sidebands obtains as shown by the dashed line. Therefore, the AR design effectively reduces the reflectance of the sidebands but has no effect on the resonance locations.

Significantly improved filter characteristics are shown to follow by the incorporation of multiple homogeneous layers with the modulated layer. The detailed filter characteristics are calculated by formulating the multi-layer diffraction problem using rigorous coupled-wave theory. A resonance equation obtained from the eigenvalue equation of the multi-layer waveguide structure using the average relative permittivity of the modulated layer gives the approximate parametric resonance locations. Concepts of diffractive optics, waveguide analysis, and thin-film optics provide good understanding of the properties of multi-layer, guided-mode, resonance filters.

In conclusion, single-layer, guided-mode, resonance, reflective filters exhibit resonance lines with symmetric, low sidebands when the layer is half-resonance-wavelength thick with equal cover and substrate permittivities. Ideal or near-ideal characteristics are found to be possible with multi-layer filters without requiring equal cover and substrate permittivities. The anti-reflection properties of the stack can be understood by regarding the modulated film as a homogeneous layer characterized by its average relative permittivity. However, as the modulation index increases, the validity of this approximation decreases. In particular, for a given high modulation index, the double-layer AR thin-film approximation failed whereas for the same modulation in a triple-layer system it held well. Generalizing this observation, it can be concluded that thin-film AR effects in a multi-layer waveguide grating stack are increasingly robust with respect to the magnitude of the modulation index as the number of layers increases.

By the addition of thin-film layers, arbitrarily extensive wavelength ranges with arbitrarily low reflectance values are obtainable. For a given grating period and layer-thicknesses, the resonance wavelength is principally determined by the average value of the relative permittivity. Thus, the resonance peak arises at the same location independent of which particular layer is the grating layer. This freedom of grating-layer placement may be important in filter fabrication.

The examples of triple-layer embodiments illustrate that once an extensive AR wavelength band (i.e., visible region) has been established, the resonance peak location can be moved around within the band by changing the grating period. As the triple-layer maintains the AR properties even for large values of the modulation index, relatively large resonance linewidths and the attendant filter passbands, are obtainable.

The ideal or near-ideal, thin-film, guided-mode, resonance, reflection filters of the present invention are potentially useful in fields such as laser technology, optical communications, optical sensing, and optoelectronics. The filters are thin (a few micrometers thick at optical wavelengths), lightweight, generally compact, and can be made with low-loss dielectric materials. Some specific applications of these devices are:

1. Narrow-band reflection filters, for example wavelength passband, $\delta\lambda<0.1$ nm.
2. Wideband reflection filters, for example, $\delta\lambda>10$ nm.
3. Polarizing elements, even at normal incidence.
4. Nonpolarized filter elements (crossed or two-dimensional gratings).
5. Laser resonator frequency-selective mirrors.
6. Non-Brewster polarizing laser mirrors.
7. Laser cavity tuning elements.
8. Electro-optic modulators (apply a voltage across an electro-optic waveguide grating.)
9. Electro-optic switches.
10. Photorefractive tunable filters.
11. Electro-optic tunable filters.
12. Mirrors and phase-locking elements for vertical-cavity surface-emitting laser arrays.
13. Spectroscopic sensor elements.

Transmission Filters

Figure 7:
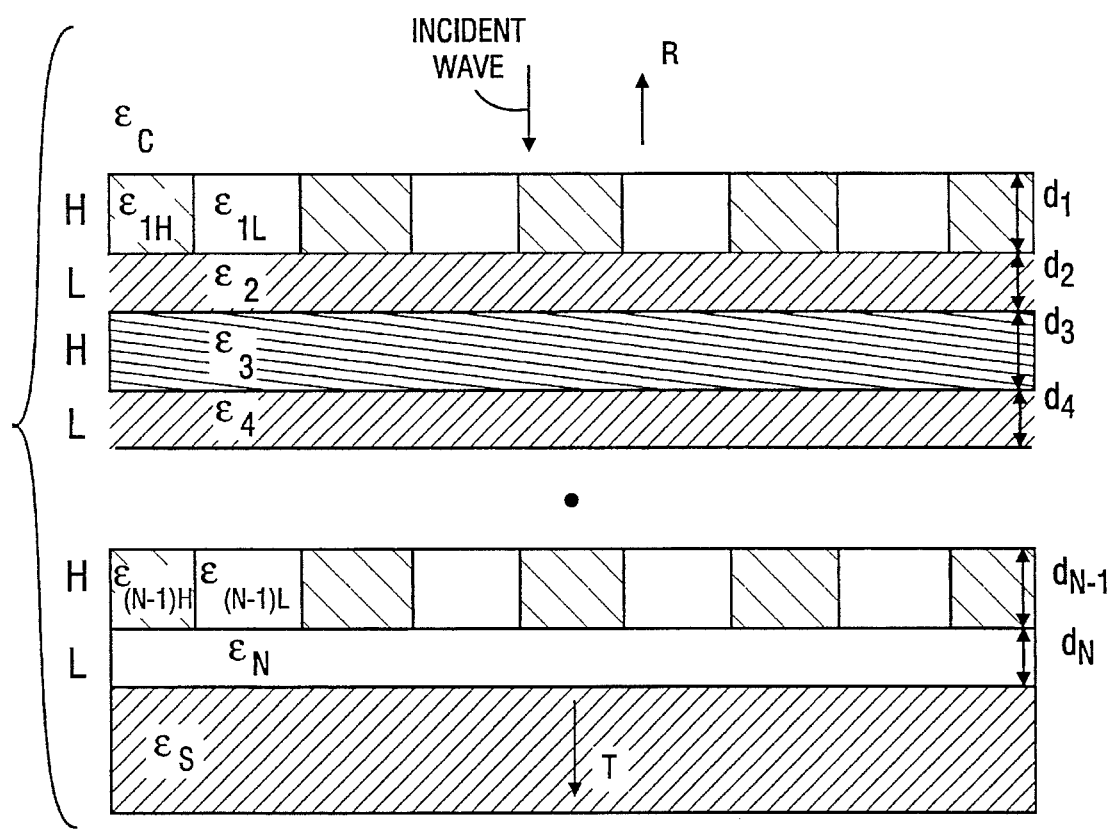
FIG. 7 is a cross-sectional view of a multi-layer transmission filter according to this invention.

Referring to FIG. 7, this embodiment of the present invention consists of interleaved, arbitrarily ordered, modulated (i.e. gratings) and unmodulated (i.e. homogeneous), multiple (N), thin-film layers. The gratings can be arbitrarily spatially shifted relative to one another and have different periods. The gratings can have a square-wave shape (depicted) or have any other arbitrary grating shape. For high-efficiency filters, the period is smaller than the resonance wavelength so that only the zero orders propagate with all higher diffracted orders cut off.

In designing a transmission filter, the basic element is a thin-film, high/low (HL) permittivity, quarter-wave pair that is highly reflective in the absence of resonance effects. In usual thin-film design, both are homogeneous layers. For guided-mode resonance based design, either layer, or both, are spatially modulated. The waveguide region may consist of several double-layer pairs placed between the substrate and the cover as shown in FIG. 7. The number of layers need not be even; for example, the final layer may be a high-refractive-index waveguide grating.

Figure 8:
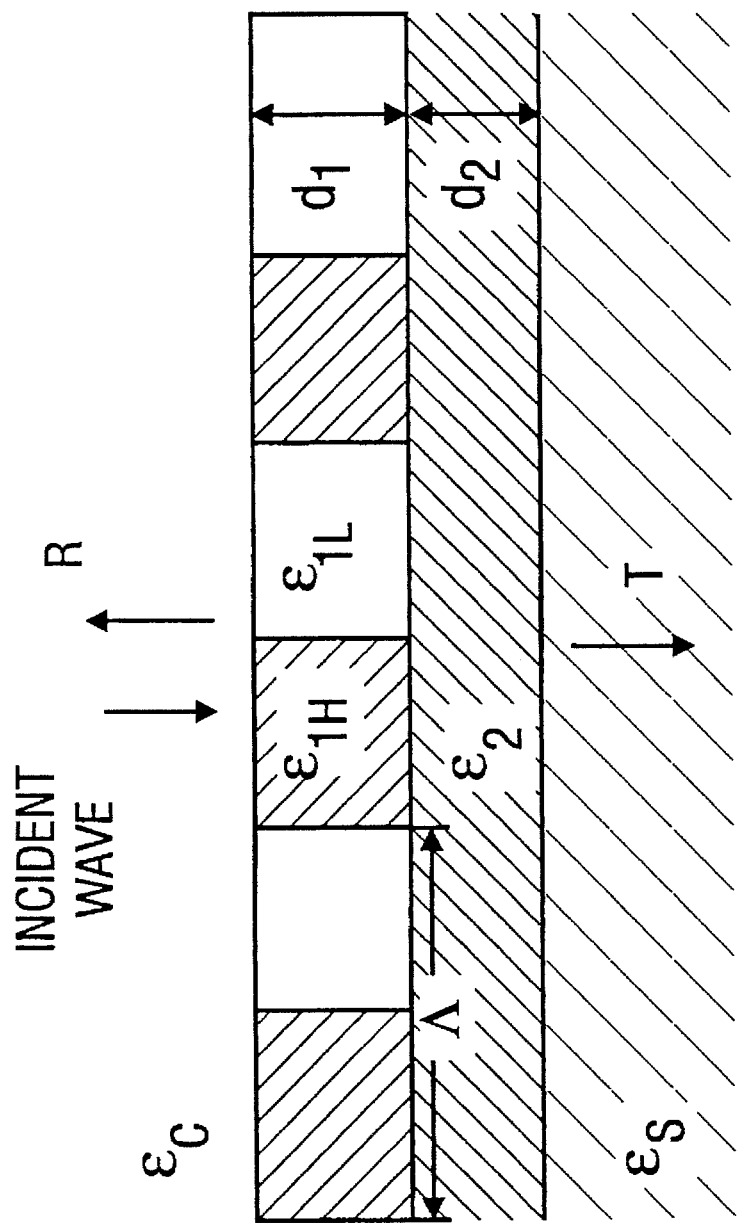
FIG. 8 is a cross-sectional view of a double-layer transmission filter according to this invention.
Figure 8A:
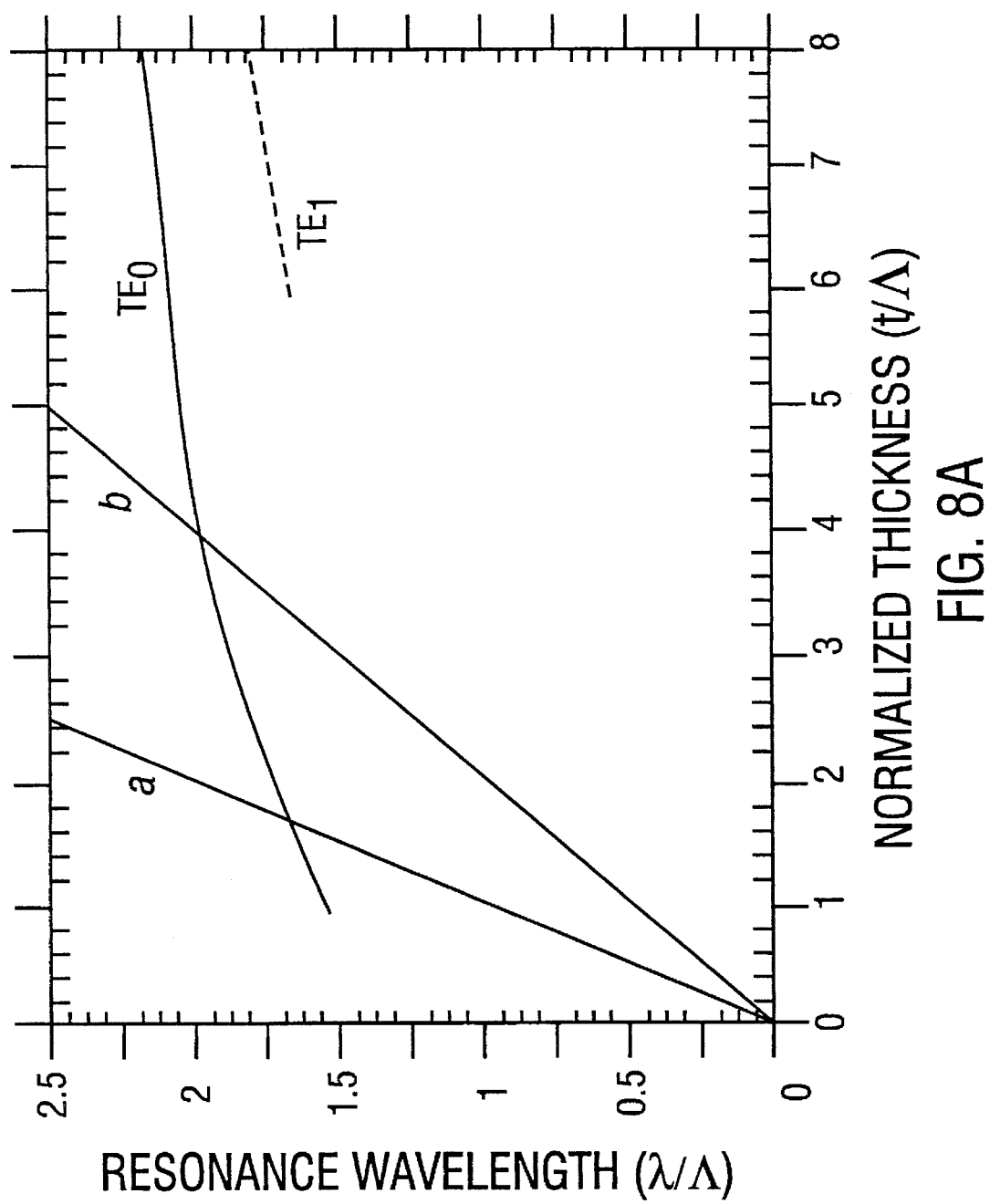
FIG. 8a is a graphical representation of the resonance-location relation for a double-layer transmission filter.
Figure 8B:
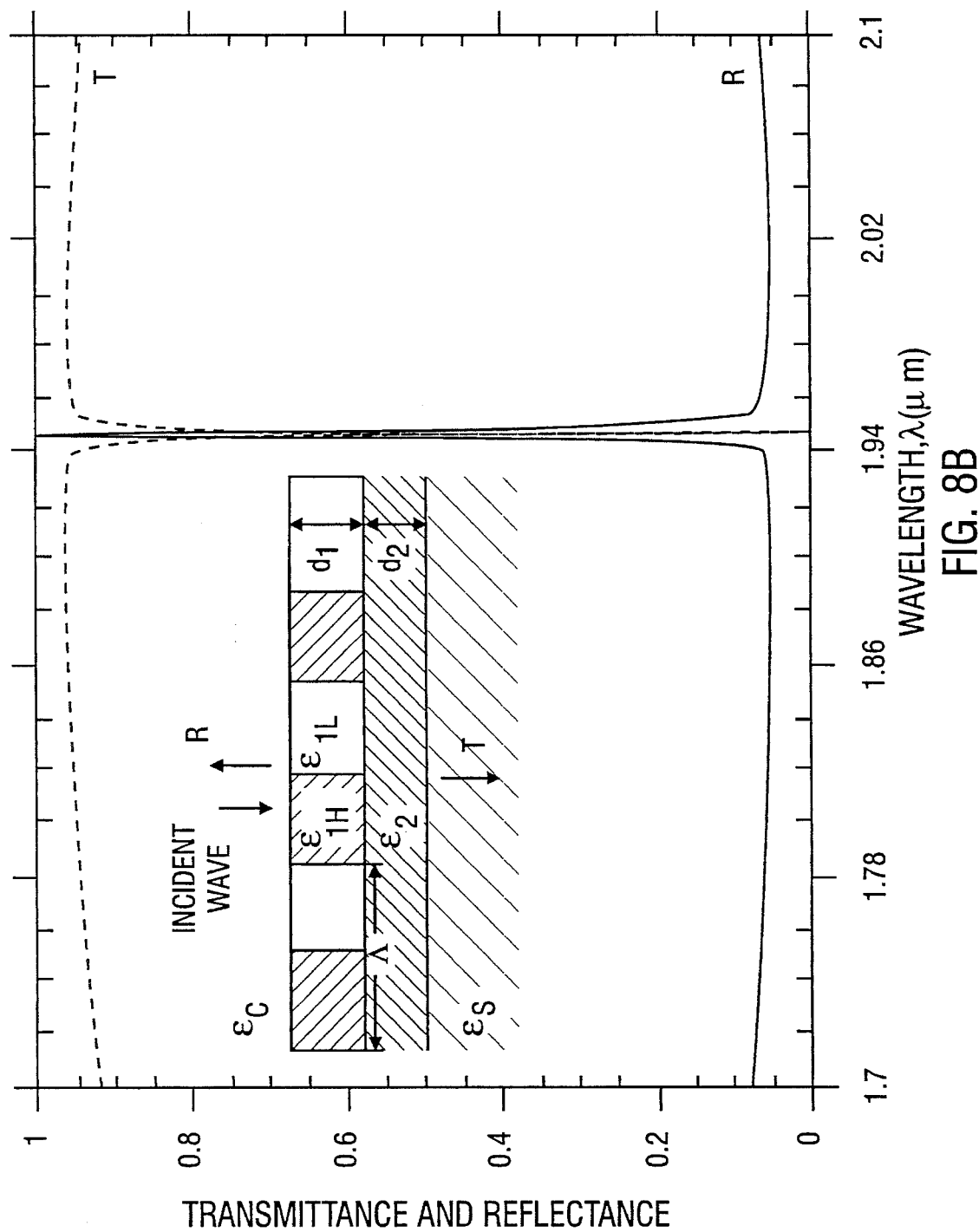
FIGS. 8b–8c are graphs depicting the TE polarization spectral response of a double-layer transmission filter according to the present invention.
Figure 8C:
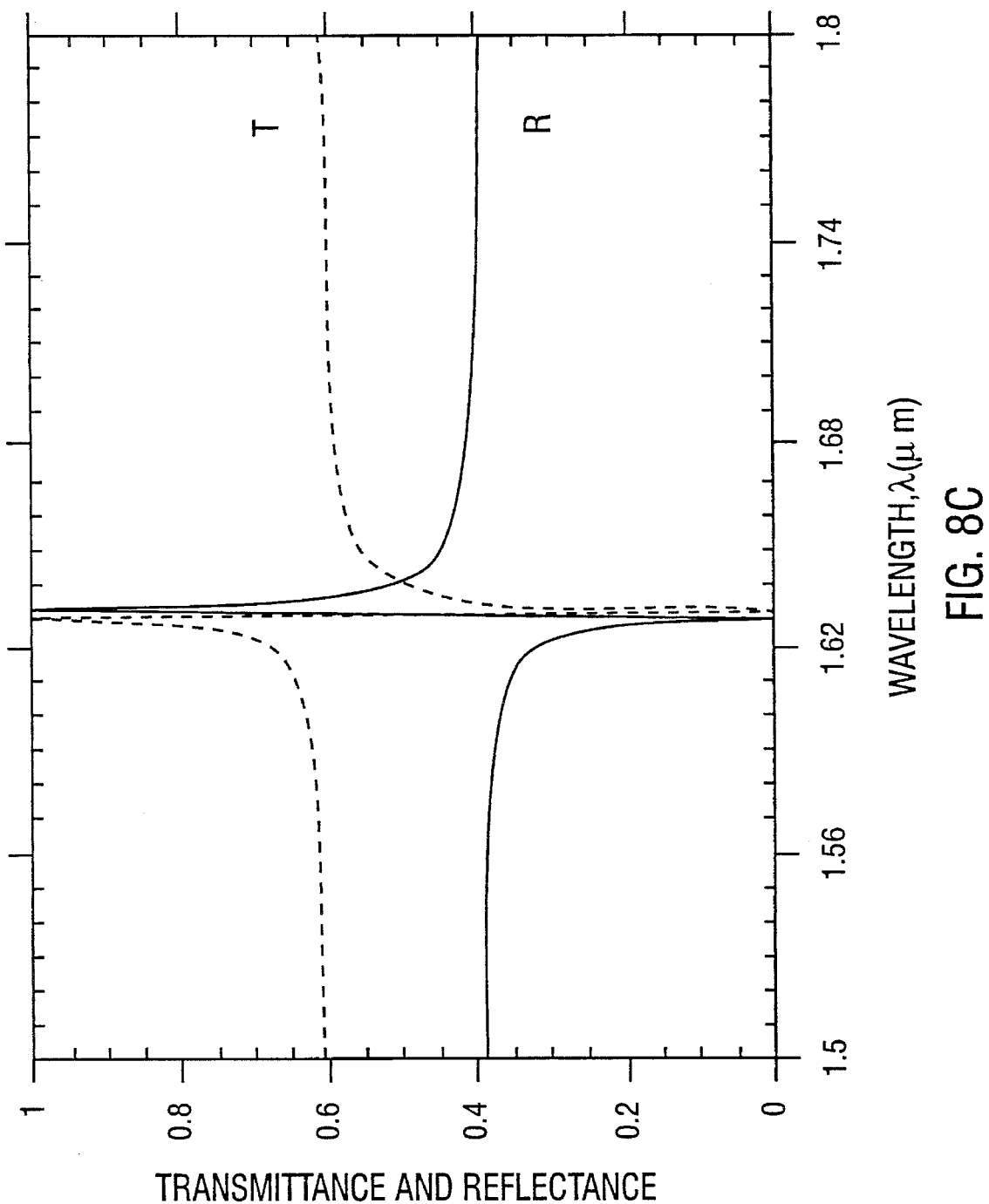

In FIG. 8, a double-layer, transmission filter is depicted in accordance with the present invention. In this particular embodiment, the first layer 10 is a waveguide grating and the second layer 20 is unmodulated ($\epsilon_2=\epsilon_{2L}$). FIG. 8a gives the approximate resonance location in terms of normalized thicknesses and resonance wavelength calculated with the eigenvalue equation for an unmodulated, two-layer waveguide with $\epsilon_c=1.0$, $\epsilon_s=2.31$, $\epsilon_{1,eff}=5.52$, $\epsilon_2=1.9$, and $\Lambda=1000$ nm. For resonance location in the neighborhood of the interception point of line b (t=2$\lambda$)and the fundamental-mode resonance curve (TE$_0$), the resulting half-wave waveguide grating design yields a symmetrical lineshape reflection filter response as shown in FIG. 8b. There is no sharp resonance minimum associated with this symmetrical line and, thus, no transmission peak can be generated. In contrast, when the grating thickness deviates from half wavelength at resonance, an asymmetrical lineshape response is found. In particular, an asymmetrical line can be produced by using the quarter-wave design at the resonance wavelength defined by the intercept point of line a (t=$\lambda$) and curve TE$_0$ in FIG. 8a. The double-layer quarter-wave waveguide grating design produces a highly asymmetrical reflection response possessing the desired deep resonance minimum adjacent to the resonance peak with relatively high reflectance around the resonance as illustrated in FIG. 8c. It is generally desirable when producing a transmission filter that the transmission peak of FIG. 8c be significantly sharpened.

In a quarter-wave transmission filter the waveguide grating layer produces a resonance that gives rise to a strong transmission peak (see FIG. 8c, where the dashed curve represents transmittance and the solid curve represents reflectance). Complete transmission through the structure occurs at a wavelength corresponding to the resonance minimum in the reflection curve. Away from resonance, the double-layer high/low permittivity thin-film structure functions as a dielectric mirror with reflectance, R, given approximately by $$R = \left(1 - \sqrt{\frac{\epsilon_s}{\epsilon_c}} \left(\frac{\epsilon_{1,eff}}{\epsilon_{2,eff}}\right)^N\right)^2 \left(1 + \sqrt{\frac{\epsilon_s}{\epsilon_c}} \left(\frac{\epsilon_{1,eff}}{\epsilon_{2,eff}}\right)^N\right)^{-2} \quad (17)$$

where N is the number of quarter resonance wavelength thick, double-layer pairs, $\epsilon_{1,eff}=(\epsilon_{1H}+\epsilon_{1L})/2$, and $\epsilon_{2,eff}=(\epsilon_{2H}+\epsilon_{2L})/2$.

Figure 9:
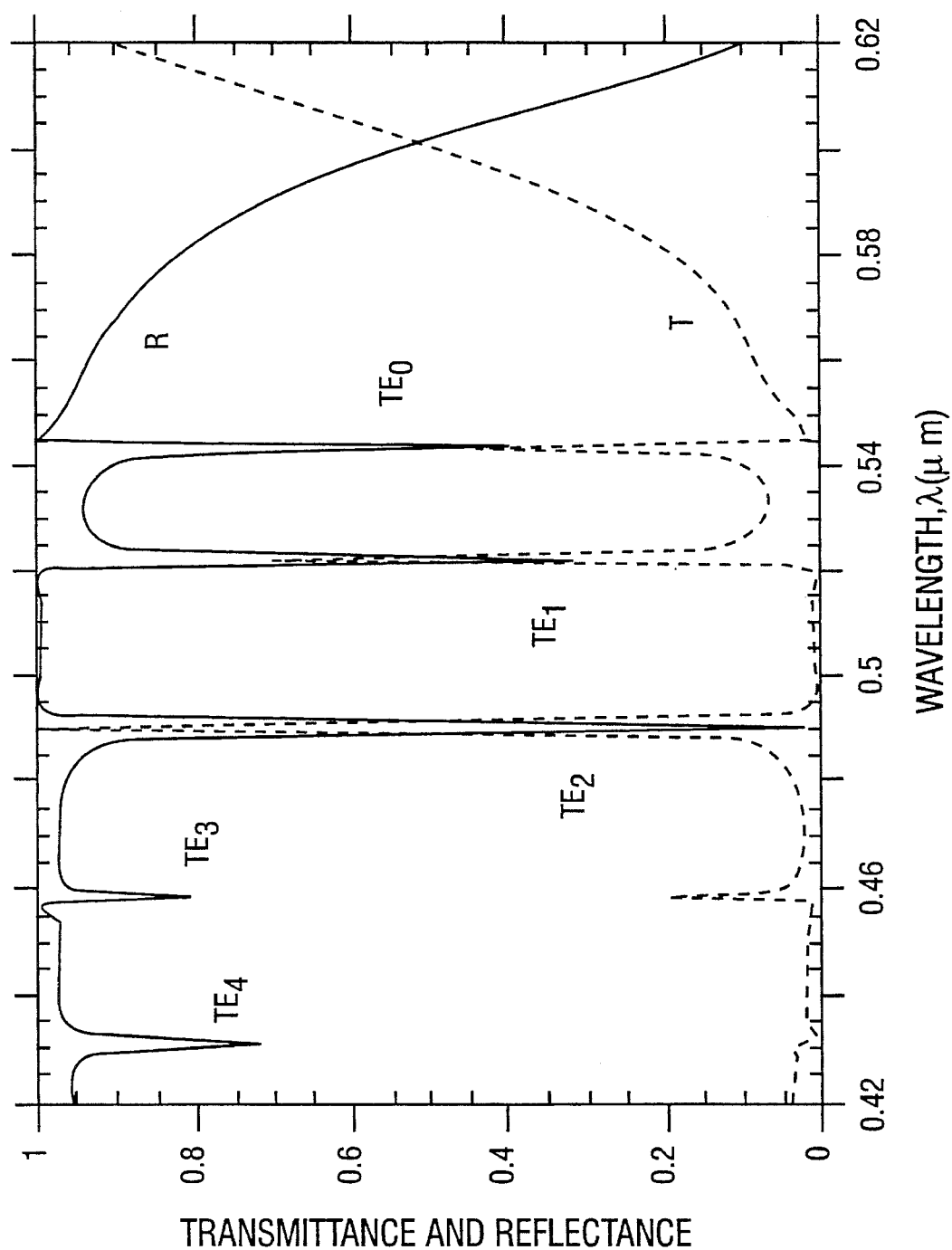
FIG. 9 is a graph depicting the TE polarization spectral response of a nine-layer transmission filter according to the present invention.
Figure 10:
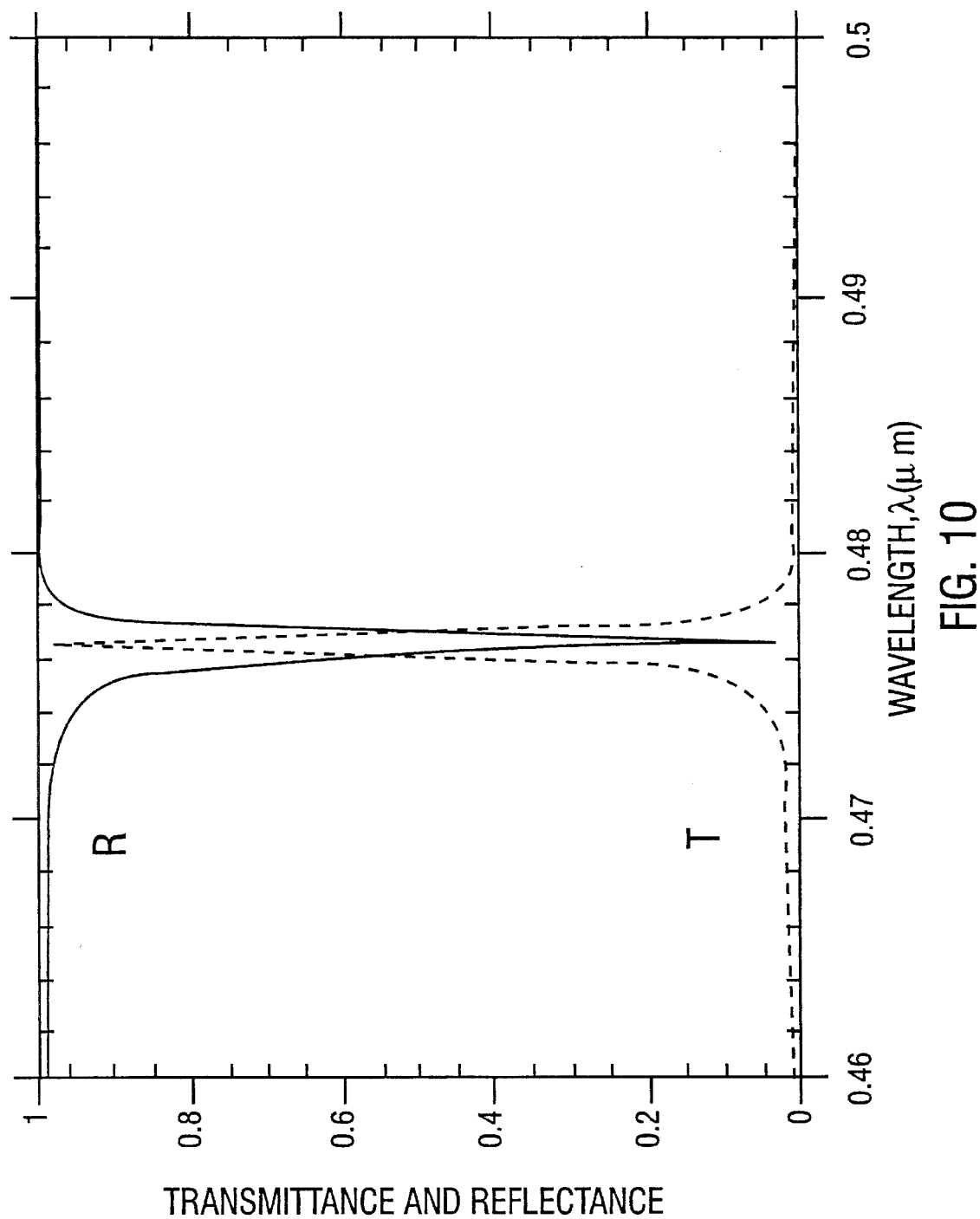
FIG. 10 is a graph depicting the TE polarization spectral response of a eleven-layer transmission filter according to the present invention.

To improve the filter characteristics, homogeneous multilayers can be incorporated and the modulated layers(s). However, a full set of HL layer pairs is not necessary to obtain good filter characteristics. For example, FIG. 9 shows the resonance features associated with a 9 layer structure (i.e. 4½ HL pairs) with the initial layer and the final layer being high-index waveguide gratings (i.e. grating-enclosed design). In this particular embodiment, $\epsilon_c=1.0$, $\epsilon_s=2.31$, $\epsilon_{1H}=\epsilon_{1H}=6.25$, $\epsilon_{1L}=\epsilon_{9L}=4.84$, $\epsilon_3=\epsilon_5=\epsilon_7=5.52$, $\epsilon_2=\epsilon_4=\epsilon_6=\epsilon_8=$ 1.9, $\lambda=0.3$ μm and all layers were ¼ $\lambda_r$. Since a large wavelength range is covered (200 nm), several resonances are observed due to the multiple waveguide modes supported by this relatively thick structure. Some resemblance to the spectral characteristics of a high-finesse Fabry-Perot cavity is observed. As indicated in FIG. 9, the fundamental mode (TE$_0$) is associated with the longest wavelength. This structure is designed as a high-reflectance stack at $\lambda=0.47$ μm. The TE$_2$ mode gives the best transmission resonance (~100%) with low sidebands over ~60 nm range. As the wavelength deviates from the quarter-wave design wavelength, the reflectance drops and transmittance rises as shown by the solid and dashed curves, respectively, in FIG. 9 for $\lambda>0.54$ μm. The resonance spectrum is superimposed on the equivalent homogeneous thin-film reflector-stack characteristics as verified by independent calculations. Finally, FIG. 10 illustrates a transmission filter response with symmetrical lineshape and low sidebands. An 11-layer (5½ HL pairs) grating-enclosed design was used having the same parameters as the filter used in FIG. 9 except that one additional HL pair is inserted between the top and bottom gratings. The dashed curve represents the transmittance and the solid curve represents the reflectance.

Figure 11:
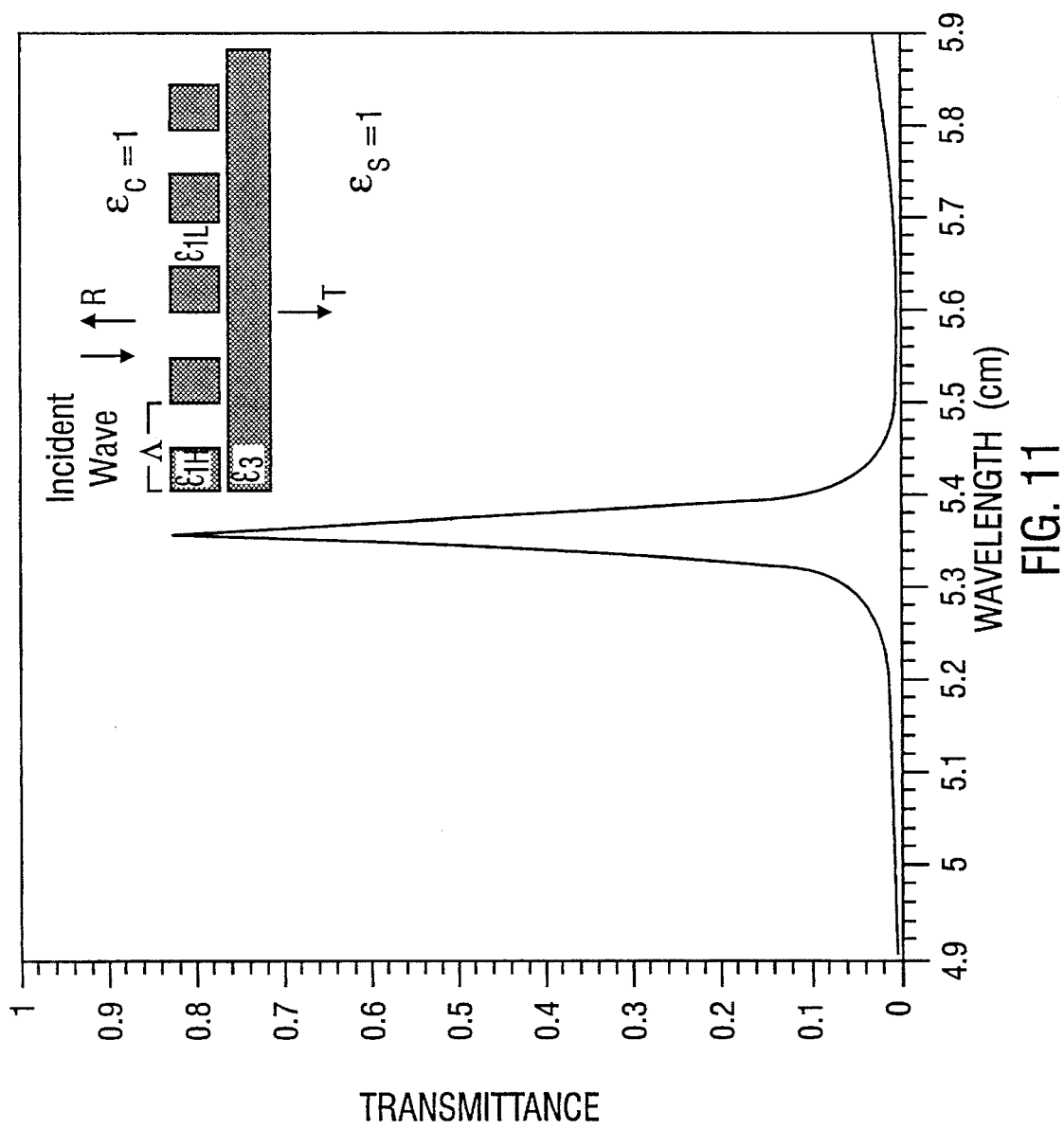
FIG. 11 is a graph depicting the TE polarization spectral response of three-layer transmission filter according to the present invention.
Figure 12:
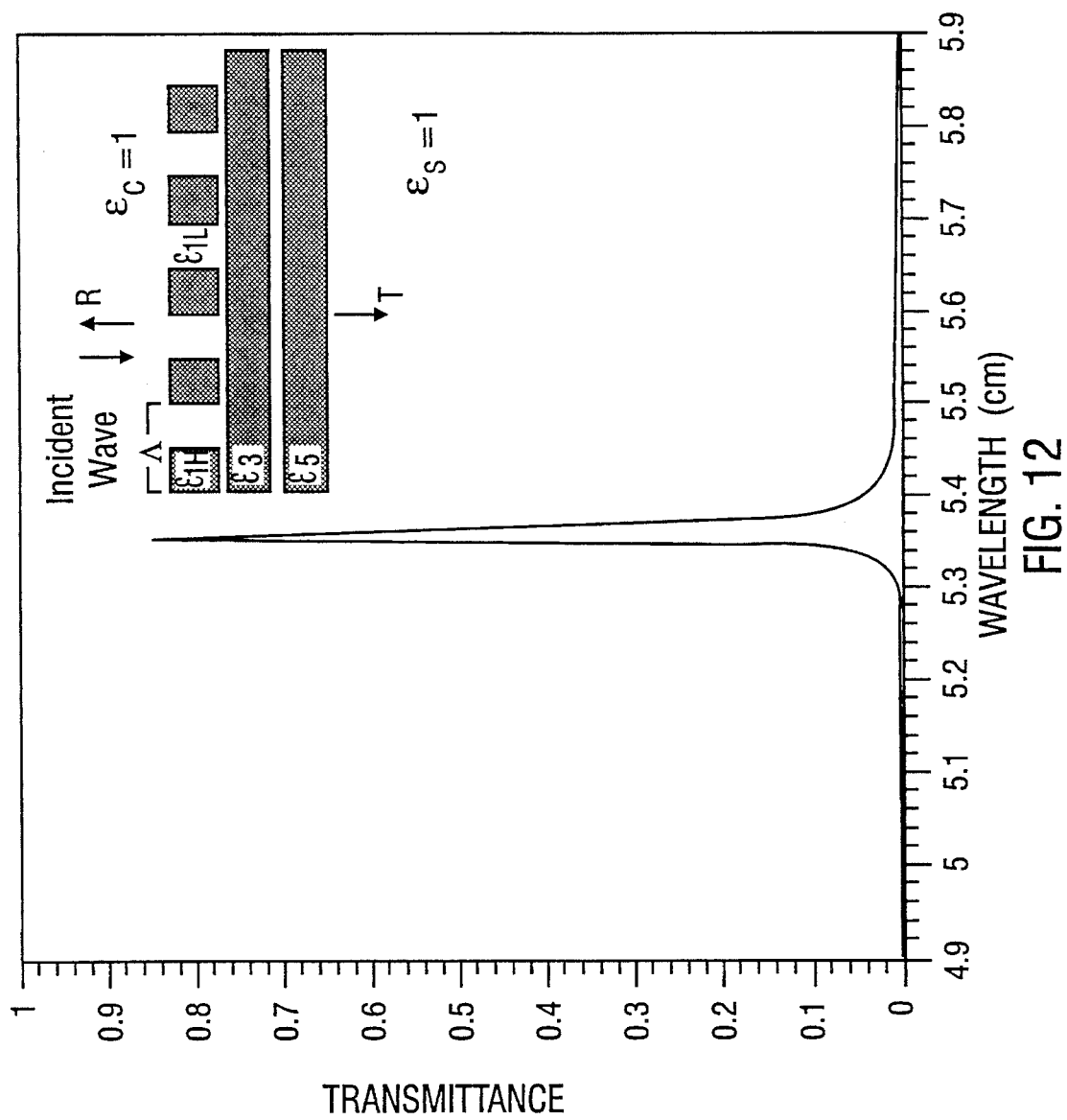
FIG. 12 is a graph depicting the TE polarization spectral response of a five-layer transmission filter according to the present invention.
Figure 13:
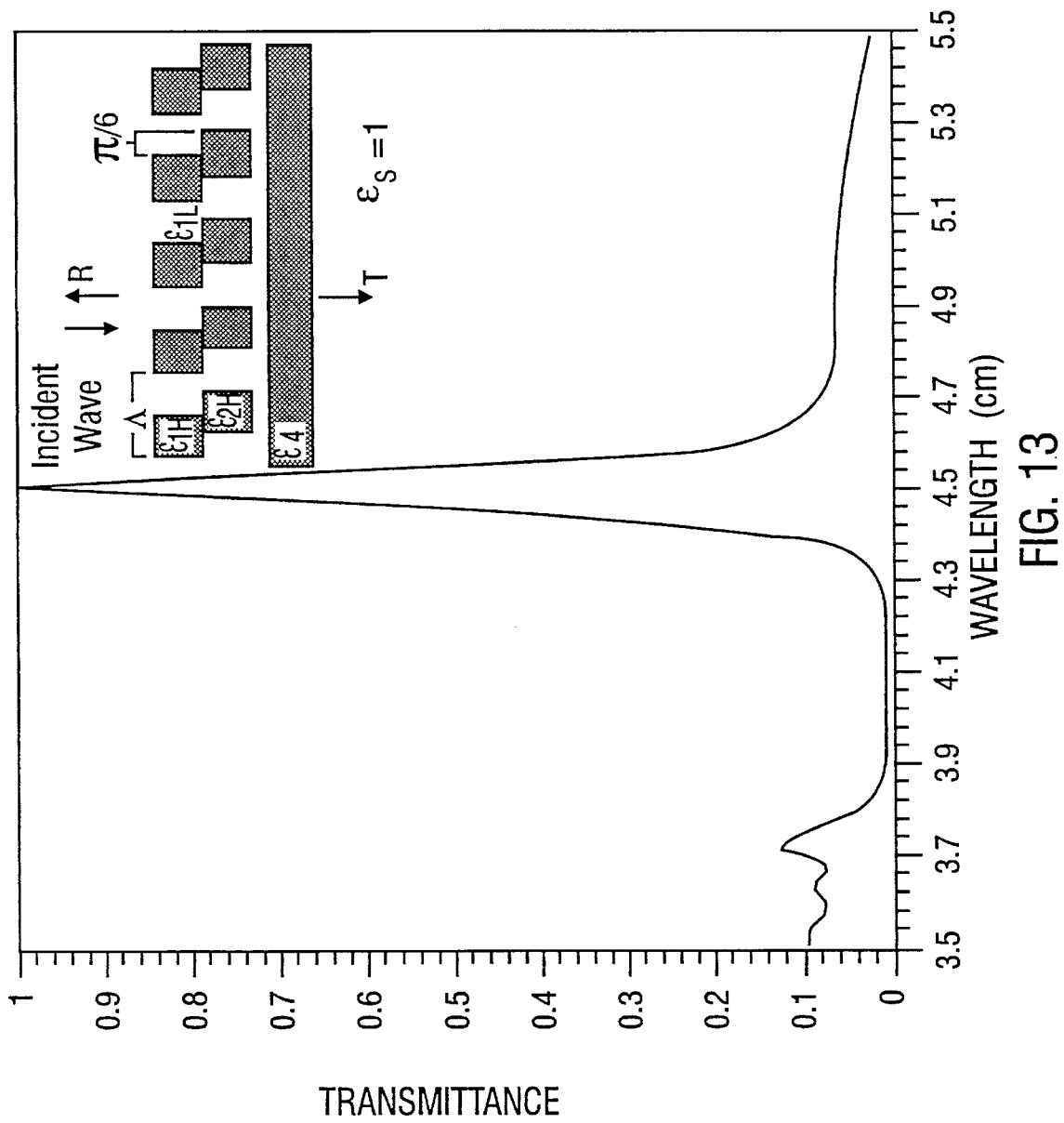
FIG. 13 is a graph depicting the TE polarization spectral response of a four-layer transmission filter according to the present invention.

FIGS. 11–13 show TE spectral responses in transmission filters to microwaves. FIG. 11 is the response of a triple-layer grating filter with resonance transmission at $\lambda_r=5.36$ cm. The grating parameters are $\Lambda=4.4$ cm, $\epsilon_{1H}=6.1$, $\epsilon_{1L}=\epsilon_2=1.0$, $\epsilon_3=6.1$, and all layers are ¼ $\lambda_r$ thick.

FIG. 12 is a TE response of a five-layer grating filter. The grating parameters are $\Lambda=4.4$ cm, $\epsilon_{1H}=6.1$, $\epsilon_{1L}=\epsilon_2=\epsilon_4=1.0$, $\epsilon_3=\epsilon_s=6.1$ and all layers are ¼ $\lambda_r$ thick.

FIG. 13 is a response for a four-layer filter with two identical $\pi_1/6$ phase-shifted gratings. The grating parameters are $\Lambda=4.4$ cm, $\epsilon_{1H}=\epsilon_{2H}=6.1$, $\epsilon_{1L}=\epsilon_{2L}=\epsilon_3=1.0$, $\epsilon_4=6.1$, and all layers are ¼ $\lambda_r$ thick.

In conclusion, in the present invention a narrow-line, polarized, transmission filter can be obtained by combining the asymmetrical guided-mode resonance response of waveguide gratings with the dielectric mirror effect of multi-layer structures. This new transmission filter produces broad-range low-transmission sidebands with nearly 100% transmission efficiency at the passband. The linewidth of filter response depends on the modulation index and on the degree of mode confinement. The central wavelength of the transmission peak can be set by the grating period. These filters have attractive features such as polarization sensitivity and high transmission efficiency with narrow controllable linewidths; a drawback is the increased fabrication complexity over unmodulated thin-film structures.

Additionally, in all the preferred embodiments of both reflective and transmission filters, the layers may be constructed of any suitable dielectric material such as ZnS, SiO$_2$, TiO$_2$, Ta$_2$O$_5$, MgF$_2$, LaF$_3$, Nd$_2$O$_3$, Pr$_6$O$_{11}$ or Si$_2$O$_3$.

The incident wave may be any electromagnetic wave having a wavelength in the region extending from microwaves down to optical wavelengths (i.e. $10^{-1}$m to $10^{-7}$m).

Figure 14:
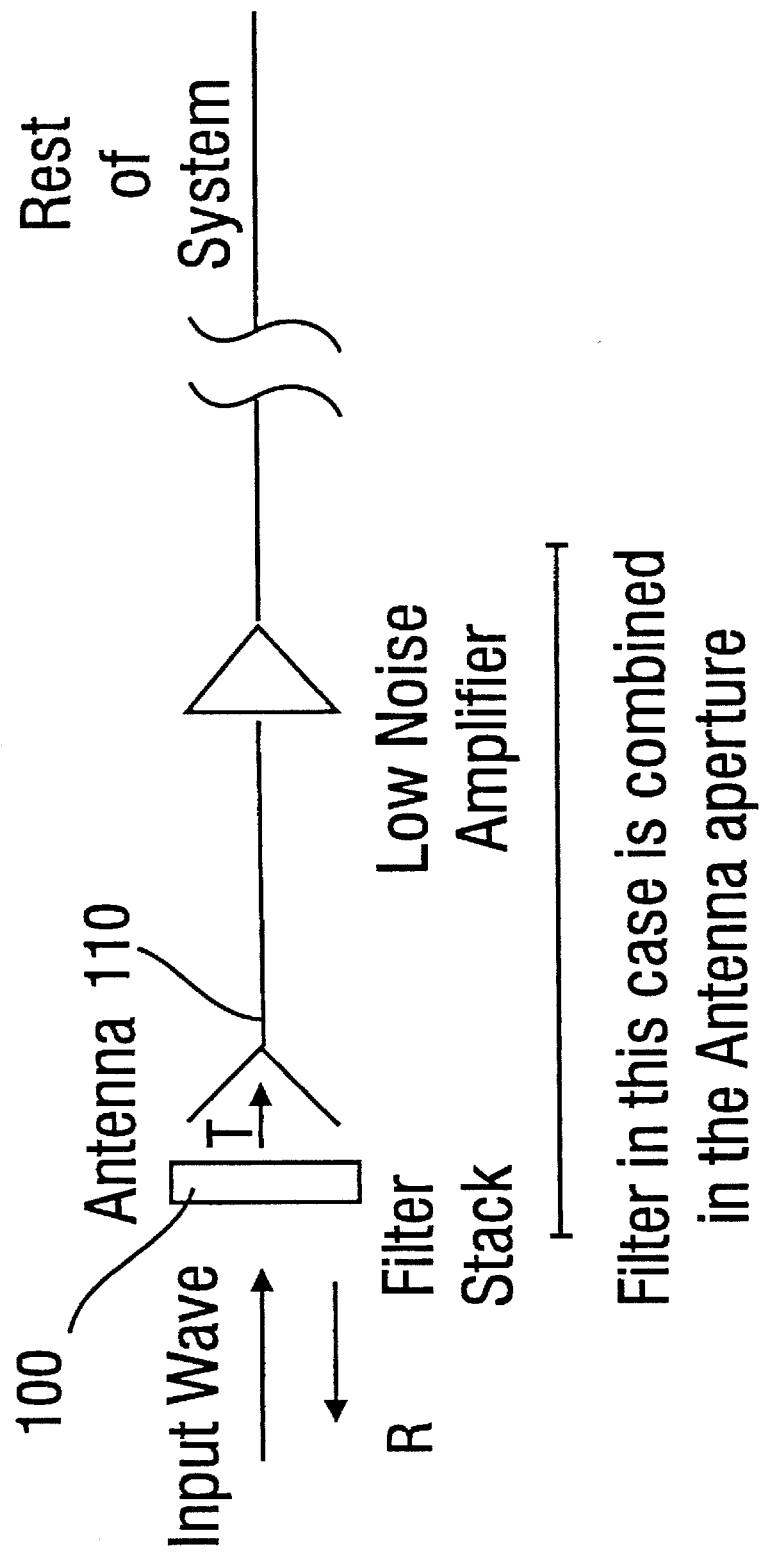
FIG. 14 is a schematic diagram of incorporating a filter according to the present invention into a microwave system.

FIG. 14 is a schematic diagram showing a filter according to the present invention being incorporated into a microwave system. The filter 100 is added to the antenna aperture 110.

The present invention has been disclosed in connection with specific embodiments. However, it will be apparent to those skilled in the art that variations from these embodiments may be undertaken without departing from the spirit and scope of the invention. Such variations will be apparent to those skilled in the art in view of the above disclosure and are within the spirit and scope of the invention.

REFERENCES

The references listed below are incorporated herein by reference to the extent they supplement, explain, provide a background for or teach methodology, techniques and/or compositions employed herein.

Hessel, A. and Oliner, A. A. "A New Theory of Woods Anomalies" Appl. Opt., vol. 4, pp. 1275–1298, October 1965.

Magnusson et al., U.S. Pat. No. 5,216,680.

Wang, S. S. and Magnusson, R. "Theory and applications of guided-mode resonance filters," Applied Optics, Vol. 32, pp. 2606–2613, 1993.

Wang, S. S. and Magnusson, R. "Multi-layer waveguide-grating filters," Applied Optics, Vol. 34, pp. 2414–2420, 1995.

What is claimed is:

1. An ideal or near ideal, multiple-layer, guided-mode, reflection, resonance filter for use with an input wave having a resonant wavelength, said filter comprising:

a cover having a cover permittivity;

a substrate having a substrate permittivity;

at least one unmodulated layer of homogenous, dielectric material having a thickness near either ¼ or ½ of said wavelength;

at least one modulated layer of an arbitrarily ordered grating adjacent to said at least one unmodulated layer and having a thickness near either ¼ or ½ of said wavelength; and wherein at least one of any said layer has a permittivity greater than both said substrate permittivity and said cover permittivity.

2. The apparatus of claim 1 wherein said at least one modulated layer has a grating period which is smaller than said wavelength.

3. The apparatus of claim 1 wherein said at least one unmodulated layer comprises two such layers located on either side of and adjacent to said at least one modulated layer.

4. The apparatus of claim 1 wherein said at least one modulated layer contains a sinusoidal, spatially periodic structure.

5. The apparatus of claim 1 wherein said at least one modulated layer contains a square, spatially periodic structure.

6. The apparatus of claim 1 wherein said wavelength is between 10 centimeter and 0.1 micrometer.

7. The apparatus of claim 1 wherein said substrate is composed of a suitable dielectric material.

8. The apparatus of claim 1 wherein said cover is composed of a suitable dielectric material.

9. The apparatus of claim 1 wherein said cover and said substrate are composed of air.

10. The apparatus of claim 1 wherein said cover is composed of air.

11. The apparatus of claim 1 wherein said substrate is composed of air.

12. The apparatus of claim 1 wherein said at least one modulated layer comprises at least two modulated layers one of which is placed at a right angle to one of the other modulated layers.

13. The apparatus of claim 1 wherein said at least one modulated layer comprises at least two modulated layers one of which has a grating period not equal to the grating period of one of the other modulated layers.

14. A method of receiving microwaves comprising the steps of:

(1) providing the apparatus of claim 1 at the aperture of a microwave antenna; and (2) receiving a microwave at said aperture of said antenna.

15. A method of filtering guided microwaves comprising the steps of:

(1) providing the apparatus of claim 1 in a microwave waveguide; and (2) receiving a filtered reflected microwave at an output port of said waveguide.

16. An ideal or near ideal, multiple-layer, guided-mode, transmission, resonance filter for use with an input wave having a resonance wavelength, said filter comprising:

a cover having a cover permittivity;

a substrate having a substrate permittivity;

at least one unmodulated layer of homogenous, dielectric material having a thickness near either ¼ or ½ of said wavelength;

at least one modulated layer of an arbitrarily ordered grating adjacent to said at least one unmodulated layer and having a thickness near either ¼ or ½ of said wavelength; and wherein at least one of any said layer has a permittivity greater than both said substrate permittivity and said cover permittivity, and wherein said permittivities of all said layers alternate from high to low.

17. The apparatus of claim 16 wherein said at least one modulated layer has a grating period which is smaller than said wavelength.

18. The apparatus of claim 16 wherein said at least one modulated layer comprises two such layers one contacting said cover, the other contacting said substrate, and wherein said at least one unmodulated layer comprises nine such layers adjacent to one another and located between said two modulated layers.

19. The apparatus of claim 16 wherein said at least one modulated layer contains a sinusoidal, spatially periodic structure.

20. The apparatus of claim 16 wherein said at least one modulated layer contains a square, spatially periodic structure.

21. The apparatus of claim 16 wherein said wavelength is between 10 centimeter and 0.1 micrometer.

22. The apparatus of claim 16 wherein the total number of said layers is an odd number.

23. The apparatus of claim 22 wherein last layer nearest the substrate is a modulated layer.

24. The apparatus of claim 16 wherein said at least one modulated layer comprises at least two modulated layers one of which is placed at a right angle to one of the other modulated layers.

25. The apparatus of claim 16 wherein said at least one modulated layer comprises at least two modulated layers one of which has a grating period not equal to the grating period of one of the other modulated layers.

26. A method of receiving microwaves comprising the steps of:

(1) providing the apparatus of claim 16 at the aperture of a microwave antenna; and (2) receiving a microwave at said aperture of said antenna.

27. A method of filtering guided microwaves comprising the steps of:

(1) providing the apparatus of claim 16 in a microwave waveguide; and (2) receiving a filtered reflected microwave at an output port of said waveguide.

28. An ideal or near ideal, multiple-layer, guided-mode, reflection, resonance filter for use with an input wave having a resonant wavelength, said filter comprising:

a cover having a cover permittivity;

a substrate having a substrate permittivity;

at least one unmodulated layer of homogenous, dielectric material having a thickness near either ¼ or ½ of said wavelength;

at least one modulated layer of an arbitrarily ordered grating adjacent to said at least one unmodulated layer and having a thickness near either ¼ or ½ of said wavelength;

wherein at least one of any said layer has a permittivity greater than both said substrate permittivity and said cover permittivity; and wherein said at least one modulated layer comprises two such layers which are spatially shifted relative to one another.

29. The apparatus of claim 28 wherein said two modulated layers have equal grating periods.

* * * * *